(12) United States Patent
Ismael et al.

(10) Patent No.: US 12,186,145 B2
(45) Date of Patent: Jan. 7, 2025

(54) HOLDING SPLINT FOR HOLDING RESTORATION FORMS

(71) Applicant: EXOCAD GMBH, Darmstadt (DE)

(72) Inventors: Gustavo Ismael, Darmstadt (DE); David Garrubba, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 0 days.

(21) Appl. No.: 17/668,474

(22) Filed: Feb. 10, 2022

(65) Prior Publication Data
US 2023/0248488 A1    Aug. 10, 2023

(51) Int. Cl.
*A61C 13/00* (2006.01)
*A61C 9/00* (2006.01)
*B33Y 80/00* (2015.01)

(52) U.S. Cl.
CPC ........ *A61C 13/0004* (2013.01); *A61C 9/0006* (2013.01); *A61C 9/0046* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 9,737,382 | B2* | 8/2017 | Morales | A61C 13/0019 |
| 2004/0005530 | A1* | 1/2004 | Mullaly | A61C 8/0048 |
| | | | | 433/172 |
| 2018/0263726 | A1* | 9/2018 | Fares | A61C 13/081 |
| 2019/0033826 | A1* | 1/2019 | Kim | G05B 19/4097 |
| 2019/0083208 | A1* | 3/2019 | Hansen | A61C 5/88 |
| 2022/0387140 | A1* | 12/2022 | Raslambekov | G06T 7/149 |
| 2023/0165666 | A1* | 6/2023 | Derzapf | A61C 19/04 |
| | | | | 382/164 |
| 2023/0240806 | A1* | 8/2023 | Shimoda | A61C 13/34 |
| | | | | 433/6 |

FOREIGN PATENT DOCUMENTS

TW      202037342 A   * 10/2020 ............. A61C 7/002
WO      WO-3490487 B1   9/2021

* cited by examiner

*Primary Examiner* — Thomas C Lee
*Assistant Examiner* — Anzuman Sharmin
(74) *Attorney, Agent, or Firm* — PERRY + CURRIER INC.

(57) ABSTRACT

The invention relates to a computer-implemented method for providing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms.

35 Claims, 13 Drawing Sheets

HOLDING SPLINT FOR HOLDING RESTORATION FORMS

The invention relates to the field of dental technology. More particularly, the invention relates to a computer-implemented method for providing a holding splint for holding one or more restoration forms. The invention furthermore relates to a computer device and a computer program product for providing a holding splint for holding one or more restoration forms as well as to a manufacturing system comprising the computer device. Furthermore, the invention relates to a holding splint for holding one or more restoration forms.

Teeth may get ground down with time. Reasons may, e.g., be bruxism or other external factors resulting in a need for a restoration of the teeth. Ground down teeth may, e.g., be covered using prefabricated dental restorations. For example, veneers may be used, like porcelain veneers manufactured using dental porcelain or composite veneers. Such prefabricated veneers are, e.g., fabricated by a dental technician in a dental lab and afterwards bonded to the respective teeth, e.g., using resin cement. Alternatively, a veneer may, e.g., be directly built-up in a patient's mouth. However, such building-up a veneer directly in a patient's mouth may be challenging. In general, it is challenging to build a dental restoration within a patient's mouth having an aesthetically appealing form individually adjusted to the appearance of a patient's teeth.

It is an objective to provide for a computer-implemented method, a computer device and computer program product for providing a holding splint for holding one or more restoration forms. Furthermore, it is an objective to provide for a manufacturing system for providing a holding splint for holding one or more restoration forms. It is a further objective to provide for a holding splint for holding one or more restoration forms.

In one aspect, the invention relates to a computer-implemented method for providing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms.

The method comprises providing a 3D digital teeth model of the set of teeth in the patient's oral cavity comprising the one or more teeth to be restored. One or more 3D digital form models of the one or more restoration forms to be held by the holding splint are provided. Using the 3D digital teeth model and the one or more 3D digital form models a 3D digital model of the holding splint is generated. The holding splint comprises one or more tooth receptions for receiving one or more teeth, when being arranged on the set of teeth. The holding splint comprises one or more cutouts for arranging the one or more restoration forms at the one or more surfaces of the one or more teeth to be restored, when they are held by the one or more holding sections. The 3D digital model of the holding splint is provided as template for manufacturing the holding splint.

Examples may have the beneficial effect, that a patient-individual holding splint configured for holding one or more restoration forms in predefined positions relative to the one or more teeth to be restored. The restoration forms may provide negatives of dental restorations to be built on the one or more teeth to be restored. In order to build the dental restorations on the one or more teeth within the patient's oral cavity, a restoration material may be applied on the respective teeth, which is shaped by the restoration forms into predefined form, i.e., into the form of the dental restorations to be built.

For example, the patient-individual holding splint may be arranged within the patient's oral cavity on the patient's dentition. The patient-individual holding splint comprises one or more tooth receptions configured for receiving one or more teeth of the patient's dentition. The patient-individual holding splint may be arranged on the dentition such that the respective teeth are received by the tooth receptions. The teeth received by the tooth receptions may be teeth not to be restored using the holding splint. For the teeth to be restored, the holding splint may comprise one or more cutouts exposing the surfaces of the one or more teeth to be restore, onto which the restoration material is to be applied. Each cutout may be formed, positioned and dimensioned such that it exposes and provides access to surfaces, e.g., labial surfaces, of one or more teeth to be restored. The one or more holding sections for the one or more restoration forms may be arranged relative to the one or more cutouts such that the restoration forms, when being held by the holding sections are arranged at the surfaces of the teeth to be restored, onto which the restoration material is to be applied.

In order to restore the teeth to be restored, the restoration material may be applied onto surfaces of the teeth to be restored, exposed by the cutouts after the patient-individual holding splint may be arranged on the patient's dentition in the patient's oral cavity. By arranging the restoration forms at the holding sections, such that the holding sections hold the restoration forms at predefined positions relative to the respective surfaces, the restoration material on these surfaces is shaped into predefined forms. The restoration forms held by the holding sections may, e.g., press the restoration material into predefined forms. The dental restoration material may, e.g., be applied in form of a paste, which is pressed into the predefined form by the restoration form being arranged within the holding splint.

The geometric form of the restoration, i.e., shape of the restored tooth, is defined by the restoration form used to restore the tooth. More precisely, the shape of the restored tooth may be defined by a surface of the restoration form facing the surface of the tooth to be restored, onto which the restoration material is applied. A shape of the surface of the restoration form may be a negative of the shape of the restored tooth to be formed using the restoration form. A distance between the restoration form held in a predefined position relative to the tooth to be restored by the holding section of the holding splint and the tooth to be restored defines a thickness of the restoration and as a result an overall size of the tooth being restored. More precisely, the thickness of the restoration is defined by the distance between the surface of the restoration form held at the predefined position, which is facing the tooth to be restored, and the surface of the tooth to be restored, onto which the restoration material is applied.

The holding sections may be configured to hold each of the restoration forms at a predefined positions relative to one of the teeth to be restored. The predefined positions for each of the restoration forms may be defined such that a clearance between the surface of the restoration form facing the surface of the tooth to be restored, onto which the restoration material is to be applied, and the respective surface of the tooth to be restored is a positive of the geometric form of the restoration to be formed on the tooth to be restored. In particular, a shape, a thickness and/or a size of the clearance may correspond to a shape, a thickness and/or a size of the restoration to be formed.

For example, the one or more holding sections may be configured to hold the one or more restoration forms in order to press the restoration material on the one or more surfaces of the one or more teeth to be restored into the predefined forms. The amount of restoration material applied onto each of the surfaces may be, e.g., slightly, larger than the amount of restoration material necessary to form the restorations. Excessive restoration material may be press laterally out of the restoration form, when the restoration form is pressed onto the restoration material and fixated in a predefined position using a holding section of the holding splint. The excessive restoration material may be removed later on. By adjusting the amount of restoration material applied to the teeth to be restored to only slightly exceed the amount of restoration material required to restore the teeth to be restored, the amount of excessive restoration material to be removed later on may be minimized.

After the restoration material shaped into the predefined forms using the one or more restoration forms has been cured, the restoration forms may be removed. Furthermore, the holding splint may be removed. Finally, the teeth with the cured restoration material may be finished, e.g., excessive restoration material may be removed and/or the cured restoration material may be polished.

The provided 3D digital teeth model may, e.g., be generated using scan data of the patient's oral cavity. For example, the patient's teeth in the oral cavity may be scanned using a scanner, e.g., an optical scanner. The achieved scan data may be used to provide the 3D digital teeth model of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model.

The 3D digital teeth model may further comprise soft tissue, like a gingiva, in addition to the hard tissue in form of the teeth, i.e., the 3D digital teeth model may be provided in form of a 3D digital tissue model of at least a section of the patient's oral cavity. The 3D digital tissue model may be generated using scan data of the patient's oral cavity. For example, the patient's tissue in the oral cavity may be scanned using a scanner, e.g., an optical scanner. The achieved scan data may be used to provide the 3D digital tissue model of the scanned tissue of the oral cavity. Alternatively, an impression of the patient's tissue in the oral cavity, i.e., a negative imprint of hard and soft tissue may be taken. Either this impression may be scanned, e.g., using an optical scanner or the negative imprint provided by the impression may be used to generate a positive reproduction of the patient's tissue, i.e., a 3D physical tissue model or cast, which is scanned, e.g., by the optical scanner to provide the scan data used to generate the 3D digital tissue model.

For example, the method further comprises manufacturing the holding splint using the 3D digital model of the holding splint as template. The manufactured holding splint is a physical copy of the template.

Examples may have the beneficial effect, that a physical holding splint may be provided for holding one or more restoration forms in predefined positions relative to one or more teeth to be restored. The predefined positions defined by the 3D digital model of the holding splint and thus by the manufactured physical holding splint may be configured such that the one or more restoration forms shape restoration material applied surfaces of the one or more teeth to be restored into predefined forms. The physical holding splint may be a patient-individual holding splint adjusted to individual anatomical and/or aesthetical features of the patient's intraoral tissue, in particular to individual anatomical and/or aesthetical features of the patient's dentition.

For example, the holding splint being manufactured uses at least one of the following: machining, 3D printing, casting.

For example, the holding splint may be manufactured using a machining device configured to manufacture the holding splint by processing a blank. For example, the holding splint may be manufactured a 3D printing device, i.e., printer, configured to print the holding splint.

For example, the set of 3D digital model of the holding splint may be used as a positive to define a negative of the holding splint in form of negative 3D digital model of the holding splint. The negative 3D digital model of the holding splint may be used to manufacture, e.g., using machining or 3D printing, a casting matrix for casting the holding splint. The manufactured matrix may be configured to cast the holding splint by inserting casting material into the casting matrix and curing the inserted casting material. The resulting holding splint may be configured such that the one or more restoration forms shape restoration material applied surfaces of the one or more teeth to be restored into predefined forms.

For example, a first trained machine learning module is used for generating the one or more 3D digital form models. The first trained machine learning module is configured to provide the 3D digital form models as output in response to receiving the 3D digital teeth model as input.

Examples may have the beneficial effect, that the trained machine learning module may be used for generating the one or more 3D digital form models of the one or more restoration forms. Each of the 3D digital form models of the restoration forms may be configured to define a negative of the restoration to be applied to the one or more teeth to be restored. Each of the 3D digital form models may, e.g., define a clearance between a tooth to be restored as defined by the 3D digital teeth model and the respective 3D digital form model arranged at a predefined position relative to the respective tooth to be restored. The clearance between the surface of the restoration form facing the surface of the tooth to be restored, onto which the restoration material is to be applied, and the respective surface of the tooth to be restored may be a positive of the geometric form of the restoration to be formed on the tooth to be restored. In particular, a shape, a thickness and/or a size of the clearance may correspond to a shape, a thickness and/or a size of the restoration to be formed.

For example, the method further comprises providing the first trained machine learning module. The providing of the first trained machine learning module comprises providing a first machine learning module to be trained. A set of first training datasets for training the first machine learning module to be trained is provided. Each first training dataset comprises a first 3D digital training teeth model and one or more first 3D digital training form models. The first machine learning module to be trained is trained to provide the one or more first 3D digital training form models of the first training datasets as output in response to receiving the first 3D digital training teeth model of the respective first training datasets as input.

The first machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module.

The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

Examples may have the beneficial effect, that by training the machine learning module to be trained, the machine learning module may be configured to provide the 3D digital form models as output in response to receiving the 3D digital teeth model as input. In order to achieve this goal, a set, i.e., a plurality, of suitable training datasets may be provided. Each of the training datasets may comprise a 3D digital training teeth model defining the input and one or more 3D digital training form models defining the output to be provided by the machine learning module. In addition, further data may be provided as input. For example, the training input data provided by the training datasets may further comprise identifiers identifying the teeth to be restored. Furthermore, the training input data may comprise a definition of a minimum thickness required by the restoration material intended to be used for restoring the teeth to be restored. Furthermore, the training input data may comprise one or more of the following data, in case the respective data is not comprised by the 3D digital training teeth model: a target color of the one or more teeth to be restored, e.g., defined by the color of one or more neighboring teeth and/or antagonists provided by additional scan data of a patient's teeth or by a color selected from a set of predefined colors, a target degree of transparency of the one or more teeth to be restored, e.g., defined by a transparency of one or more neighboring teeth and/or antagonists provided by additional scan data of a patient's teeth or by a transparency, e.g., selected from a set of predefined transparencies.

Thus, the resulting first trained machine learning module may be configured to provide 3D digital form models as output, which each define a clearance between the 3D digital form model and a tooth to be restored with suitable characteristics to complete the patient's dentition by patient-individual restoring the tooth to be restored. The clearance may have a thickness configured to be equal or larger than a minimum thickness required by the restoration material intended to be used. Furthermore, the thickness may be configured to achieve a target color of the restoration, e.g., defined by the color of one or more neighboring teeth and/or antagonists provided by the 3D digital teeth model or by additional scan data of the patient's teeth. Alternatively, a color, e.g., selected from a set of predefined colors, may be provided as an additional input to the machine learning module. The thickness may be configured to achieve a target degree of transparency of the restoration, e.g., defined by the degree of transparency of one or more neighboring teeth and/or antagonists provided by the 3D digital teeth model or by additional scan data of the patient's teeth. Alternatively, a degree of transparency, e.g., selected from a set of predefined colors, may be provided as an additional input to the machine learning module. The thickness may be configured to achieve a target form of the restored tooth. The target form may, e.g., be determined using the forms of the teeth of the patient as defined by the 3D digital teeth model. For example, the forms of one or more neighboring teeth and/or antagonists provided by the 3D digital teeth model may be used to determine the target form.

For example, the first training datasets may further comprise for each of the one or more first 3D digital training form models a definition of a position the respective first 3D digital training form model relative to the tooth to be restored using the respective first 3D digital training form model. The first machine learning module to be trained may be trained to provide the definitions of the positions in addition to the one or more first 3D digital training form models of the first training datasets as output in response to receiving the first 3D digital training teeth model of the respective first training datasets as input. Thus, the resulting first trained machine learning module may be configured to provide for each of the 3D digital form models a definition of a position relative to a tooth of the 3D digital teeth model to be restored as output in response to receiving the 3D digital teeth model as input.

For example, the method further comprises generating using the 3D digital teeth model a 3D digital restoration model comprising restorations of the one or more teeth to be restored. Using the 3D digital restoration model the provided one or more 3D digital form models are generated. The restoration forms comprise negatives of restored sections of the restorations of the one or more teeth to be restored.

Examples may have the beneficial effect, that a 3D digital restoration model may be provided defining the restorations of the one or more teeth to be restored. The 3D digital restoration model may be used to generate the one or more 3D digital form models. Furthermore, the 3D digital restoration model may be used to generate 3D digital model of the holding splint. For example, the 3D digital restoration model may be used to define positions of the one or more 3D digital form models relative to the one or more teeth of the 3D digital teeth model to be restored.

The restored teeth may correspond to the teeth to be restored as defined by the 3D digital teeth model each add with a restoration. For example, the 3D digital restoration model may be generated starting with the 3D digital teeth model and adding restorations to the teeth to be restored. For example, the 3D digital restoration model may be generated starting with the 3D digital teeth model by replacing the one or more teeth of the 3D digital teeth model to be restored by restored teeth. For example, the teeth to be restored may be segmented and replaced by restored teeth. The restored teeth may, e.g., be digitally generated from scratch. The restored teeth may, e.g., be generating using neighboring teeth or mirroring antagonists. The neighboring teeth or mirrored antagonists may be adjusted to the anatomical and/or aesthetical requirements defined by the patient's dentition for the restored teeth. For example, one or more artificial teeth or teeth elements may be selected from a tooth library and used to provide the restored teeth to be formed. For example, the library teeth may be may be adjusted to the anatomical and/or aesthetical requirements defined by the patient's dentition for the restored teeth.

The restorations defined by the 3D digital restoration model may be configured such that they each comprise a thickness for the restoration material to be applied onto the surface of tooth to be restored as defined by the 3D digital teeth model with the thickness being configured to achieve a target color of the restoration, a target degree of transparency of the restoration, a target form of the restored tooth, and/or a thickness of the restoration equal or larger than a minimum thickness required by the restoration material intended to be used.

For example, a second trained machine learning module is used for generating the 3D digital restoration model. The second trained machine learning module is configured to provide the 3D digital restoration model as output in response to receiving the 3D digital teeth model as input.

Examples may have the beneficial effect, that the trained machine learning module may be used for generating the 3D digital restoration model. The 3D digital restoration model may comprise restorations of one or more teeth to be restored. Using the 3D digital restoration model, e.g., the one or more 3D digital form models may be generated. The generated restoration forms may comprise negatives of restored sections of the restorations of the one or more teeth to be restored as defined by the 3D digital restoration model. Furthermore, the 3D digital restoration model may be used to generate 3D digital model of the holding splint. For example, the 3D digital restoration model may be used to define positions of the one or more 3D digital form models relative to the one or more teeth of the 3D digital teeth model to be restored.

The restorations defined by the 3D digital restoration model may be configured such that they each comprise a thickness for the restoration material to be applied onto the surface of tooth to be restored as defined by the 3D digital teeth model with the thickness being configured to achieve a target color of the restoration, a target degree of transparency of the restoration, a target form of the restored tooth, and/or a thickness of the restoration equal or larger than a minimum thickness required by the restoration material intended to be used.

For example, the method further comprises providing the second trained machine learning module. The providing of the second trained machine learning module comprises providing a second machine learning module to be trained. A set of second training datasets for training the second machine learning module to be trained is provided. Each second training dataset comprises a second 3D digital training teeth model and a second 3D digital training restoration model. The second machine learning module to be trained is trained to provide the second 3D digital training restoration models of the second training datasets as output in response to receiving the second 3D digital training teeth model of the respective second training datasets as input.

The second machine learning module to be trained may, e.g., be an untrained machine learning module, a pre-trained machine learning module or a partially trained machine learning module.

Examples may have the beneficial effect, that by training the machine learning module to be trained, the machine learning module may be configured to provide the 3D digital restoration model as output in response to receiving the 3D digital teeth model as input. In order to achieve this goal, a set, i.e., a plurality, of suitable training datasets may be provided. Each of the training datasets may comprise a 3D digital training teeth model defining the input and a 3D digital training restoration model defining the output to be provided by the machine learning module. In addition, further data may be provided as input. For example, the training input data provided by the training datasets may further comprise identifiers identifying the teeth to be restored. Furthermore, the training input data may comprise a definition of a minimum thickness required by the restoration material intended to be used for restoring the teeth to be restored. Furthermore, the training input data may comprise one or more of the following data, in case the respective data is not comprised by the 3D digital training teeth model: a target color of the one or more teeth to be restored, e.g., defined by the color of one or more neighboring teeth and/or antagonists provided by additional scan data of a patient's teeth or by a color selected from a set of predefined colors, a target degree of transparency of the one or more teeth to be restored, e.g., defined by a transparency of one or more neighboring teeth and/or antagonists provided by additional scan data of a patient's teeth or by a transparency, e.g., selected from a set of predefined transparencies.

Thus, the resulting second trained machine learning module may be configured to provide 3D digital restoration models as output with one or more restorations with suitable characteristics to complete the patient's dentition. The restorations may have a thickness relative to the teeth to be restored as defined by the 3D teeth model configured to be equal or larger than a minimum thickness required by the restoration material intended to be used. Furthermore, the thickness may be configured to achieve a target color of the restoration, e.g., defined by the color of one or more neighboring teeth and/or antagonists provided by the 3D digital teeth model or by additional scan data of the patient's teeth. Alternatively, a color, e.g., selected from a set of predefined colors, may be provided as an additional input to the machine learning module. The thickness may be configured to achieve a target degree of transparency of the restoration, e.g., defined by the degree of transparency of one or more neighboring teeth and/or antagonists provided by the 3D digital teeth model or by additional scan data of the patient's teeth. Alternatively, a degree of transparency, e.g., selected from a set of predefined colors, may be provided as an additional input to the machine learning module. The thickness may be configured to achieve a target form of the restored tooth. The target form may, e.g., be determined using the forms of the teeth of the patient as defined by the 3D digital teeth model. For example, the forms of one or more neighboring teeth and/or antagonists provided by the 3D digital teeth model may be used to determine the target form.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a 3D digital restoration form or a 3D digital restoration model provided as output by the trained machine learning module from other, known values, e.g., a 3D digital teeth model comprising one or more teeth to be restored. According to an example, the machine learning module comprises a deep learning model.

For example, the restorations of the one or more teeth to be restored are patient-individual restorations. The one or more 3D digital models of the one or more restoration forms are one or more 3D digital models of one or more patient-individual restoration forms. The patient-individual restoration forms comprise negatives of patient-individual restored sections of the patient-individual restorations.

Examples may have the beneficial effect, that a patient-individual holding splint for holding patient-individual restorations may be provided. The restorations shaped using the patient-individual restoration forms may be adjusted to the individual anatomical and/or aesthetical features of the patient's dentition, ensuring a natural and individual aesthetical appearance of the restored teeth.

The 3D digital models of the patient-individual restoration forms may, e.g., be generated from scratch. For example, 3D digital models of generic restoration forms may be selected from a from a form library of generic restoration forms. The generic restoration forms of the form library may, e.g., comprise negatives of sections of the generic teeth from the tooth library. The selected 3D digital models of generic restoration forms may, e.g., be adjusted to individual anatomical and/or aesthetical features and/or requirement of the patient's dentition resulting in the 3D digital models of patient-individual restoration forms.

For example, the patient-individual restoration forms generated are patient-individual veneer forms configured to shape restoration material applied onto the teeth to be restored into patient-individual veneers. Such patient-individual veneers may be direct veneers, e.g., composite veneers, build up directly within the patient's oral cavity.

For example, the restorations of the one or more teeth to be restored are generic restorations. The generating of the 3D digital restoration model comprises replacing the one or more teeth to be restored by one or more generic teeth from a tooth library. The one or more 3D digital models of the one or more restoration forms are one or more 3D digital models of one or more generic restoration forms. The generating of the one or more 3D digital models of the one or more restoration forms comprises selecting one or more 3D digital models of the one or more generic restoration forms from a form library of generic restoration forms. The generic restoration forms of the form library comprise negatives of sections of the generic teeth from the tooth library.

Examples may have the beneficial effect, that generic restoration forms as defined by the selected 3D digital models of generic restoration forms may be used to restore the teeth to be restored. For example, pre-manufactured restoration forms defined by the 3D digital models of generic restoration forms may be provided and used to restore the teeth to be restored. The holding splint may be configured to hold these pre-manufactured restoration forms at predefined positions relative the teeth to be restored of the patient's individual dentition.

For example, the form library of generic restoration forms is a veneer library of generic veneer forms. The generic veneer forms may be configured to shape restoration material applied onto the teeth to be restored into generic veneers. Such generic veneers may be direct veneers, e.g., composite veneers, build up directly within the patient's oral cavity.

For example, the generating of the 3D digital restoration model comprises replacing the one or more teeth to be restored by one or more natural teeth of the patient being mirrored. Examples may have the beneficial effect, that 3D digital models of natural teeth of the patient provided by the 3D digital restoration model may be used to replace 3D digital models of the teeth to be restored. 3D digital models of natural teeth replacing the 3D digital models of the teeth to be restored may defined used as definitions of the restored teeth. For example, antagonists may be mirrored and used to replace the teeth to be restored. The antagonists used as replacements may, e.g., further be adjusted to anatomical and/or aesthetical requirements of the restored teeth.

For example, the generating of the 3D digital restoration model comprises replacing the one or more teeth to be restored by one or more natural teeth of the patient. The natural teeth of the patient used for replacement may, e.g., be neighboring teeth. The neighboring teeth used as replacements may, e.g., further be adjusted to anatomical and/or aesthetical requirements of the restored teeth.

For example, the method further comprises using the one or more 3D digital form models as templates for manufacturing the one or more restoration forms. Each of the manufactured restoration forms is a physical copy of one of the templates.

Examples may have the beneficial effect, that one or more physical restoration forms may be provided, which may be used in combination with the holding splint to shape restoration material applied onto the patient's teeth to be restored into the into forms defined by the restoration forms. The 3D digital form models may, e.g., be patient-individual form models used for manufacturing patient-individual restoration forms.

For example, the one or more restoration forms are manufactured using at least one of the following: machining, 3D printing, casting.

For example, the one or more restoration forms may be manufactured using one or more machining devices configured to manufacture restoration forms by processing blanks. Multiple restoration forms may, e.g., be manufactured successively using the same machining device or in parallel using one or more machining devices. For example, the one or more restoration forms may be manufactured using one or more 3D printing devices, i.e., printers, configured to print molding matrices. Multiple restoration forms may, e.g., be manufactured successively using the same 3D printing device or in parallel using one or more 3D printing devices.

For example, the one or more restoration forms may be used as positives to define negatives of the restoration forms in form of negative 3D digital form models. The negative 3D digital form models may be used to manufacture, e.g., using machining or 3D printing, one or more casting matrices. Each of the manufactured matrices may be configured for casting one of the restoration forms by inserting casting material into the respective casting matrix and curing the inserted casting material. The resulting restoration forms may be configured to shape restoration material applied surfaces of the one or more teeth to be restored into predefined forms, i.e., restorations.

For example, the holding splint comprises a plurality of tooth receptions for receiving a plurality of the teeth. Examples may have the beneficial effect, that the tooth receptions may be used to fixate the holding splint at a predefined position on a dental arch of the patient. The tooth receptions may, e.g., be negatives of teeth of the patient defined by the 3D digital teeth model, which are not to be restored. Thus, the holding splint may be configured to ensure a stable fitting onto a patient's dental arch comprising one or more teeth to be restored. The tooth receptions may be patient-individual tooth receptions and the holding splint a patient-individual holding splint.

For example, the holding splint comprises a single holding section for holding a single restoration form. Examples may have the beneficial effect, that the holding splint may be configured to restore a single tooth of a patient requiring restoration.

For example, the holding splint comprises a single cutout for arranging the single restoration form at a single surface of a single tooth to be restored. Examples may have the beneficial effect, that a surface of a single tooth to be restored may be exposed by the holding splint for applying restoration material and arranging a restoration form thereon.

For example, the holding splint comprises a plurality of holding sections for holding a plurality of restoration forms. Examples may have the beneficial effect, that the holding splint may be configured to hold a plurality of restoration forms enabling a restoration of a plurality of teeth of a patient to be restored in parallel.

For example, the holding splint comprises a cutout configured for arranging a plurality of restoration forms at a plurality of surfaces of a plurality of teeth to be restored. The size and form of the cutout may be configured such that surfaces of a plurality of teeth to be restored are exposed by the cutout. Examples may have the beneficial effect, that a plurality of surfaces of teeth to be restored may be exposed by the cutout of the holding splint for applying restoration material and arranging a restoration form thereon.

For example, the holding splint comprises a plurality of cutouts for arranging a plurality of restoration forms at a plurality of surfaces of a plurality of teeth to be restored. Each of the cutouts may expose one or more of the plurality of surfaces of the teeth to be restored. Examples may have the beneficial effect, that by the plurality of cutouts surfaces of a plurality of teeth to be restored may be exposed by the holding splint for applying restoration material and arranging a restoration form thereon.

For example, the one or more holding sections are configured to establishing one or more non-destructively detachable physical connections between the holding splint and the restoration forms in order to hold the one or more restoration forms in place.

Examples may have the beneficial effect, that the holding splint may be arranged on a patient's dental arch and restoration material may be applied onto the teeth of the dental arch to be restored. After the restoration material is applied, the restoration forms may be arranged onto the restoration material and attached to the holding splint by establishing the non-destructively detachable physical connections in order to shape the restoration material into a predefined forms of the restorations to be formed on the teeth to be restored. After the restoration material is cured, the non-destructively detachable physical connections may be detached and the restoration forms removed from the holding splint. The holding splint may be removed from the patient's dental arch and the restored teeth may, e.g., be finished.

For example, the one or more non-destructively detachable physical connections are snap-fits established by the holding sections receiving holding extensions of the restoration forms. Examples may have the beneficial effect, that the snap-fits may enable an easy attaching and detaching of the restoration forms to and from the holding splint. The snap-fits may, e.g., be formed using an elastic material. For example, the snap-fits may each comprise two opposing clamping elements, between which the holding extension of a restoration form is clamped.

The snap-fits may be arranged on the holding splint at predefined positions relative to the teeth to be restored. Thus, the restoration forms may be attachable to the holding splint at predefined positions relative to the tooth to be restored.

For example, the support section may further comprise a vertical support element configured to define a vertical position of the restoration form relative to the tooth to be restored. For example, the vertical support element may be implemented in form of a protrusion, on which the restoration form may be arranged. The protrusion may, e.g., extend in vestibular, e.g., labial, direction. For example, the vertical support element may be arranged at a distal end of the support section relative to the tooth to be restored.

For example, the restoration forms may have a spoon-like shape comprising a shallow bowl and a handle. The shallow bowl may provide a negative of the predefined form into which the restoration material is to be shaped by the restoration form, i.e., the shape of the shallow bowl defines the shape of the restoration formed on the tooth to be restored. The handle may be configured as a holding extension of the restoration form to be received by a snap-fit of a holding section of the holding splint. When the handle is received by the snap-fit, a non-destructively detachable physical connection may be established between the restoration form and the holding splint. The positions of the restoration forms relative to the teeth to be restored may, e.g., be defined by the handles, e.g., by the forms of the handles and the positions of the snap-fits. The handles may, e.g., have straight elongated forms. In this case, the lengths of the handles may, e.g., define the positions of the restoration forms relative to the teeth to be restored.

For example, the one or more holding sections are configured to hold the one or more restoration forms in order to shape the restoration material applied onto one or more labial surfaces of the one or more teeth to be restored into the predefined form. Examples may have the beneficial effect, that the holding sections relative to the teeth to be restored may be arranged labially at the holding splint. The holding sections may be configured to hold the restoration forms in predefined positions relative to the teeth to be restored such that the restoration forms are arranged facing labial surfaces of the teeth to be restored.

The predefined positions for each of the restoration forms may be defined such that a clearance between a surface of the restoration form facing a labial surface of the tooth to be restored, onto which the restoration material is to be applied, and the respective labial surface of the tooth to be restored is a positive of the geometric form of the restoration to be formed on the tooth to be restored. In particular, a shape, a thickness and/or a size of the clearance may correspond to a shape, a thickness and/or a size of the restoration to be formed.

For example, the one or more restoration forms are veneer forms. Examples may have the beneficial effect, that the restoration forms are configured to form veneers on the teeth to be restored by shaping restoration material applied on the respective teeth into veneers.

For example, the set of teeth is one of the following: a mandibular dental arch, a maxillary dental arch.

For example, the set of teeth comprises one or more natural teeth. For example, the set of teeth is a set of natural teeth. For example, the teeth to be restored comprise one or more natural teeth to be restored.

For example, the set of teeth comprises one or more artificial teeth. For example, the set of teeth is a set of artificial teeth. For example, the teeth to be restored comprise one or more artificial teeth to be restored.

In another aspect, the invention relates to a computer program product for providing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms. The computer program product comprises a computer readable storage medium having program instructions embodied therewith.

The program instructions are executable by a processor of a computer device to cause the computer device to provide a 3D digital teeth model of the set of teeth in the patient's oral cavity comprising the one or more teeth to be restored. One or more 3D digital form models of the one or more restoration forms to be held by the holding splint are provided. Using the 3D digital teeth model and the one or more 3D digital form models a 3D digital model of the holding splint is generated. The holding splint comprises one or more receptions for receiving one or more teeth, when being arranged on the set of teeth. The holding splint comprises one or more cutouts for arranging the one or more restoration forms at the one or more surfaces of the one or more teeth to be restored, when being held by the one or more holding sections. The 3D digital model of the holding splint is provided as template for manufacturing the holding splint.

The program instructions provided by the computer program product may be configured for causing the computer device to execute any of the aforementioned methods for providing a holding splint for holding one or more restoration forms.

For example, the program instructions further are executable to cause the computer device to generate using the 3D digital teeth model a 3D digital restoration model comprising restorations of the one or more teeth to be restored. Using the 3D digital restoration model the provided one or more 3D digital form models of the one or more restoration forms are generated. The restoration forms comprise negatives of restored sections of the restorations of the one or more teeth to be restored.

In another aspect, the invention relates to a computer device for providing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms. The computer device comprises a processor and a memory storing program instructions executable by the processor.

Execution of the program instructions by the processor causes the computer device to provide a 3D digital teeth model of the set of teeth in the patient's oral cavity comprising the one or more teeth to be restored. One or more 3D digital form models of the one or more restoration forms to be held by the holding splint are provided. Using the 3D digital teeth model and the one or more 3D digital form models a 3D digital model of the holding splint is generated. The holding splint comprises one or more receptions for receiving one or more teeth, when being arranged on the set of teeth. The holding splint comprises one or more cutouts for arranging the one or more restoration forms at the one or more surfaces of the one or more teeth to be restored, when being held by the one or more holding sections. The 3D digital model of the holding splint is provided as template for manufacturing the holding splint.

The computer device may be configured for executing any of the aforementioned methods for providing a holding splint for holding one or more restoration forms.

For example, execution of the program instructions by the processor further causes the computer device to generate using the 3D digital teeth model a 3D digital restoration model comprising restorations of the one or more teeth to be restored. Using the 3D digital restoration model the provided one or more 3D digital form models of the one or more restoration forms are generated. The restoration forms comprise negatives of restored sections of the restorations of the one or more teeth to be restored.

In another aspect, the invention relates to a manufacturing system comprising the computer device for providing a holding splint for holding one or more restoration forms. The manufacturing system further comprises a manufacturing device configured to manufacture the holding splint. Execution of the program instructions by the processor further causes the computer device to control the manufacturing device to manufacture the holding splint using the 3D digital model of the holding splint as template. The manufactured holding splint is a physical copy of the respective template.

The manufacturing system may be configured for manufacturing any of the aforementioned examples of a holding splint for holding one or more restoration forms.

For example, the manufacturing device further is configured to manufacture the one or more restoration forms using the 3D digital models of the one or more restoration forms as templates. Each of the manufactured restoration forms is a physical copy of one of the respective templates.

The manufacturing system may be configured for manufacturing any of the aforementioned examples of restoration forms configured to be held by a holding splint.

For example, the manufacturing system comprises at least one of the following: a machining device, a 3D printing device.

In another aspect, the invention relates to a holding splint for holding one or more restoration forms. The holding splint is configured for being arranged in a patient's oral cavity on a set of teeth comprising one or more teeth to be restored. The holding splint comprises one or more tooth receptions for receiving one or more teeth, when being arranged on the set of teeth. The holding splint comprises one or more holding sections configured to hold the one or more restoration forms in order to shape restoration material applied onto one or more surfaces of the one or more teeth to be restored into a predefined form using the one or more restoration forms. The holding splint comprises one or more cutouts for arranging the one or more restoration forms at the one or more surfaces of the one or more teeth to be restored, when being held by the one or more holding sections.

The holding splint may, e.g., be a machined, 3D printed and/or casted holding splint.

The holding splint may be any of the aforementioned examples of a holding splint. The holding splint may be manufactured using any of the aforementioned examples of a method for manufacturing a holding splint.

For example, the holding splint is equipped with the one or more restoration forms to be held by the holding splint.

For example, the one or more restoration forms are patient-individual restoration forms configured to apply the restoration material on the one or more surfaces of the one or more teeth to be restored into a predefined patient-individual form.

For example, the one or more restoration forms are generic restoration forms configured to apply the restoration material on the one or more surfaces of the one or more teeth to be restored into a predefined generic form.

The above-described examples and embodiments may be combined freely as long as the combinations are not mutually exclusive.

In the following, embodiments of the invention are described in greater detail in which FIG. 1 shows an exemplary 3D digital teeth model;

Figure 5C:
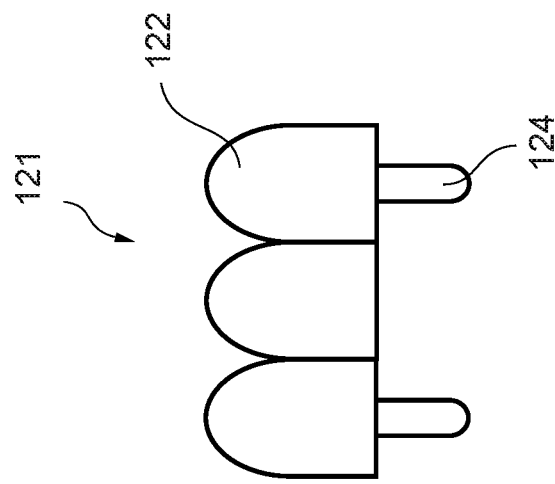
Figure 5B:
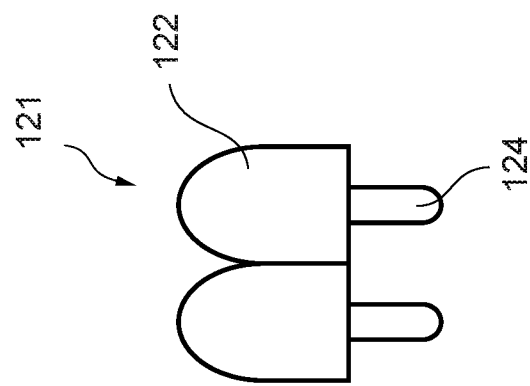
Figure 5A:
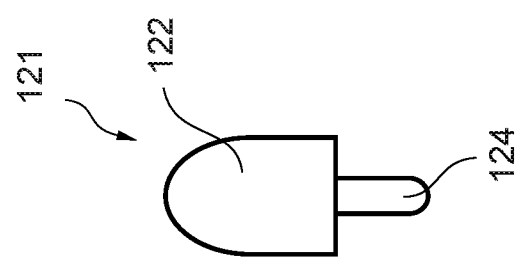
Figure 6:
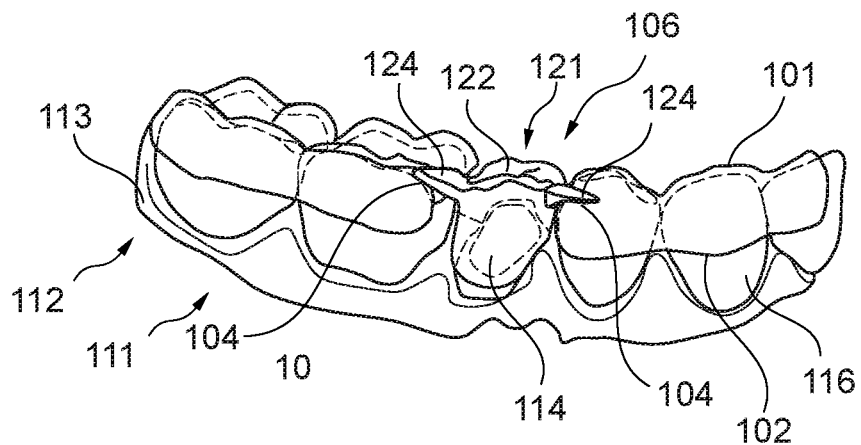
Figure 7:
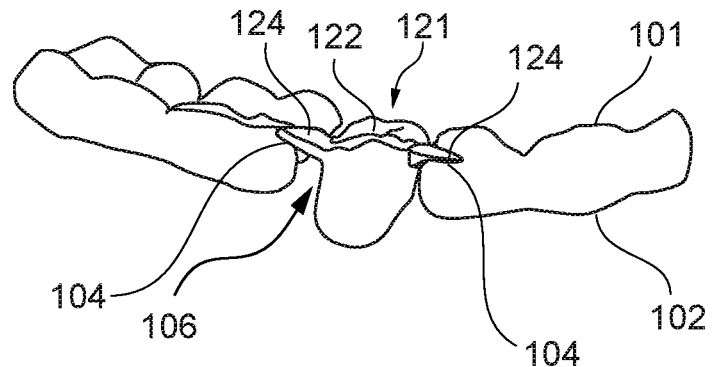
Figure 8:
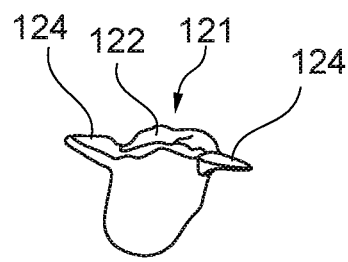
Figure 9:
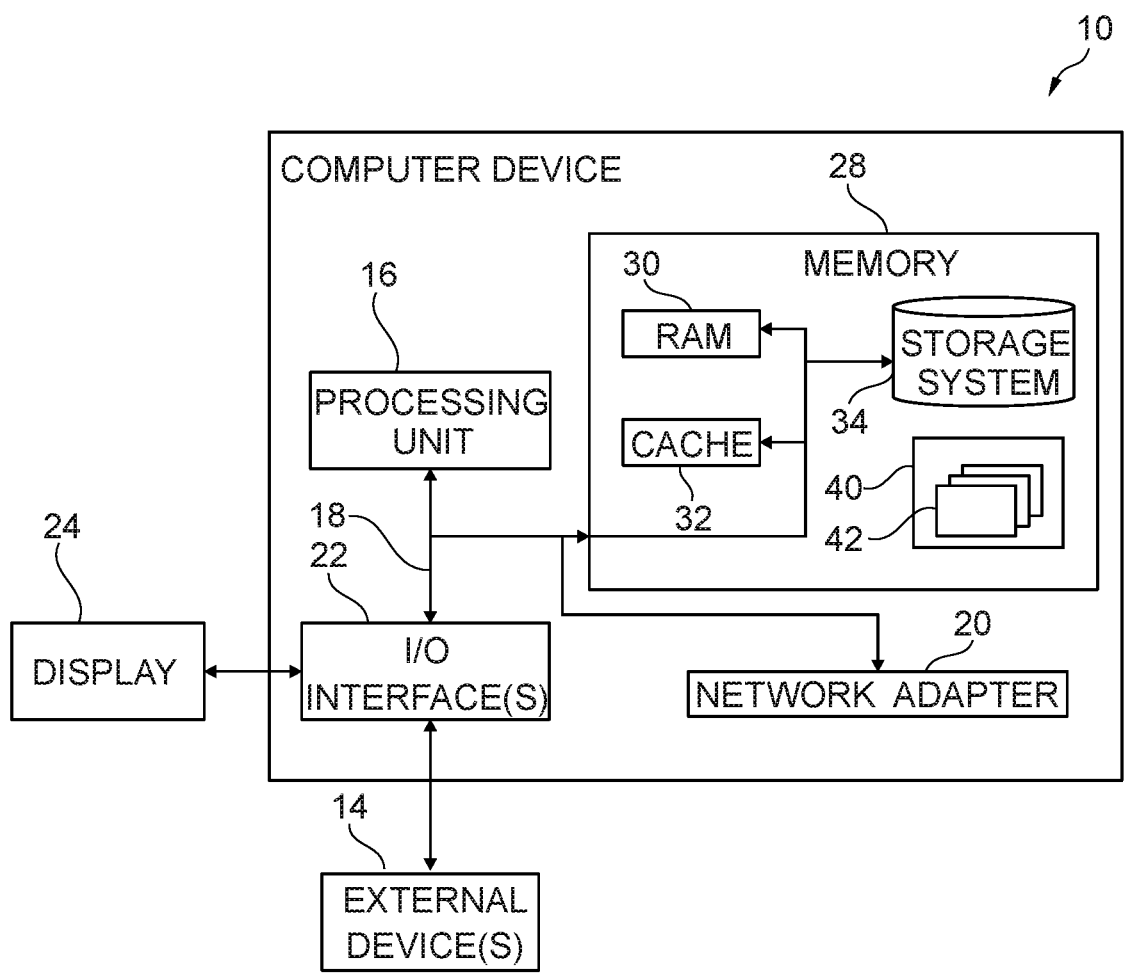
Figure 10:
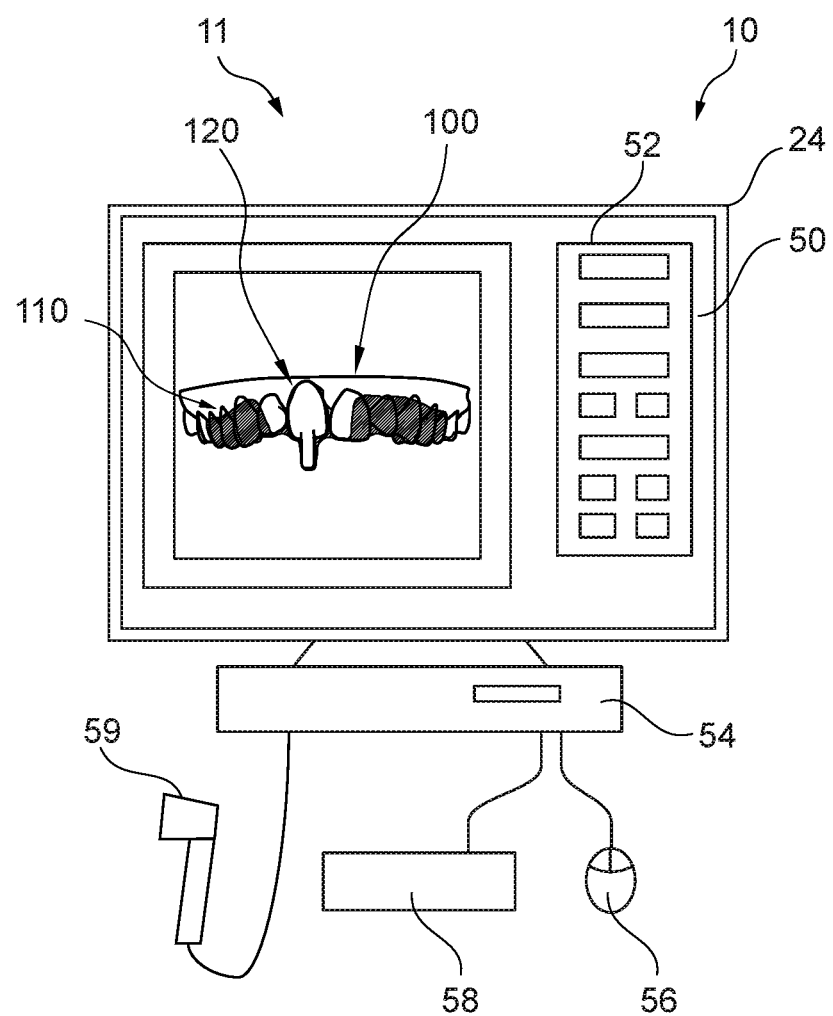
Figure 11:
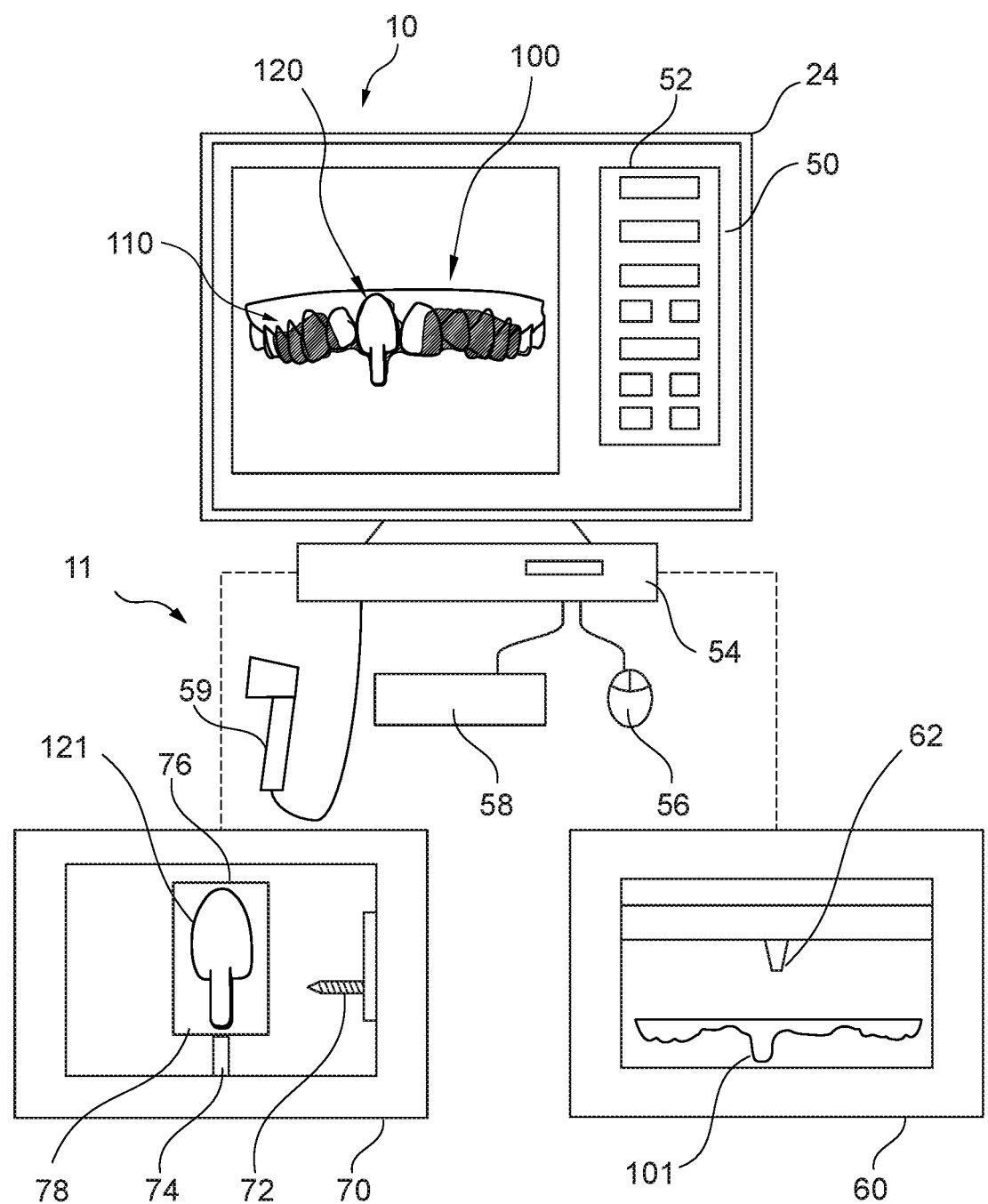
Figure 12:
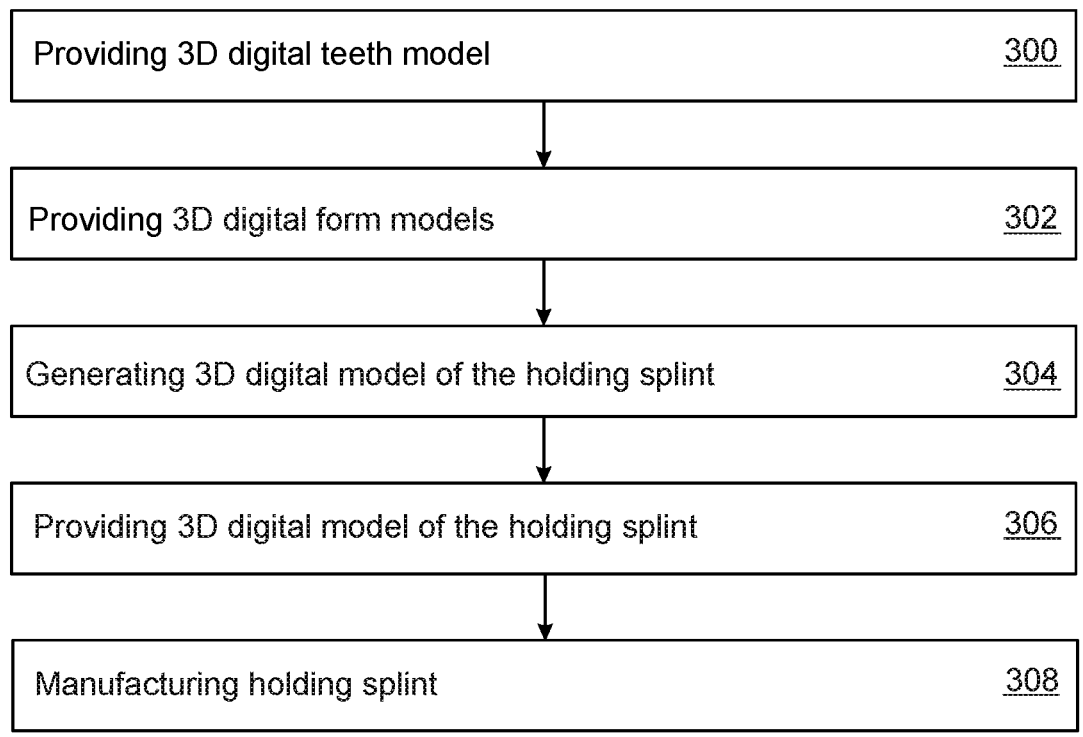
Figure 13:
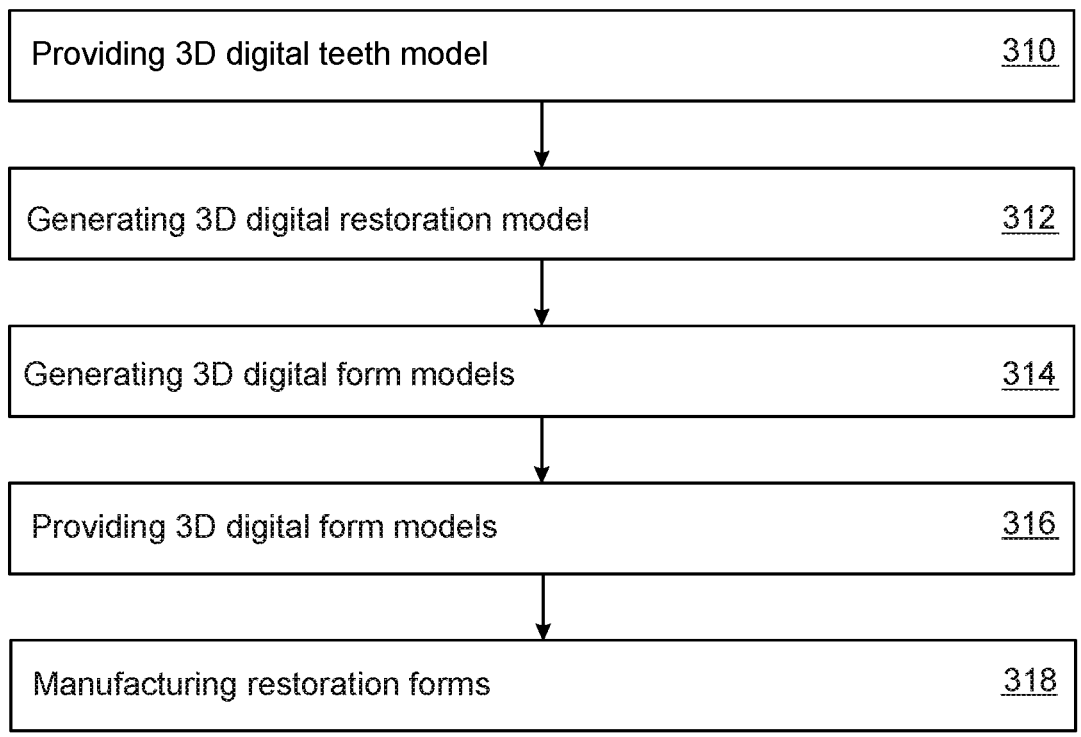
Figure 14:
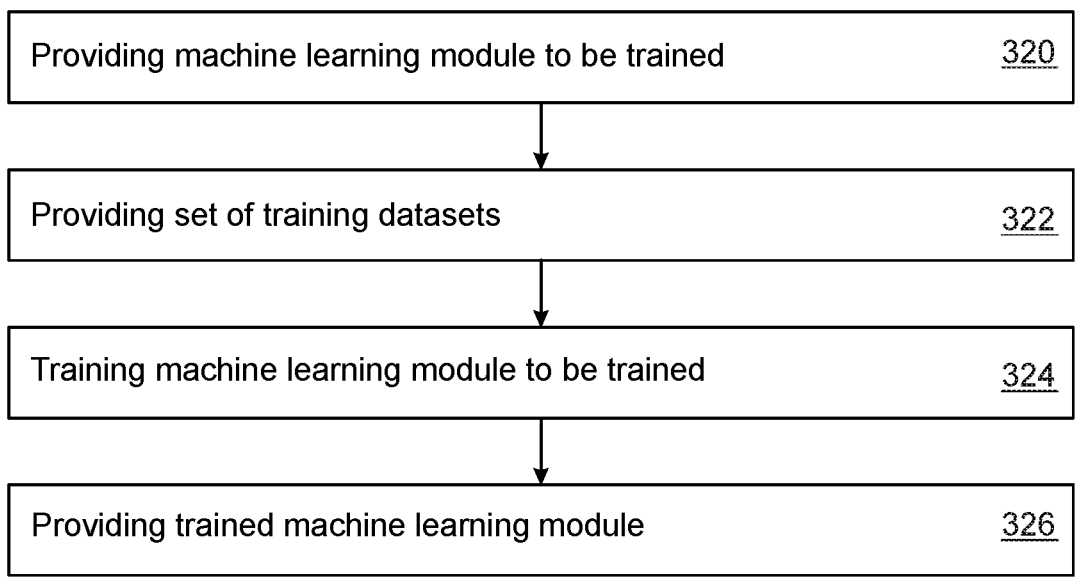
Figure 15:
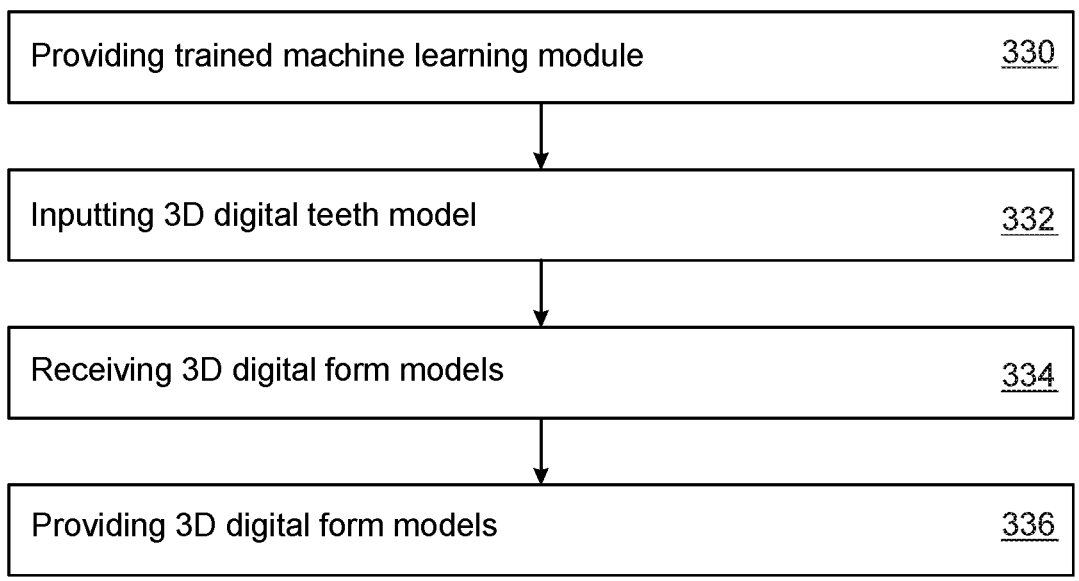
Figure 16:
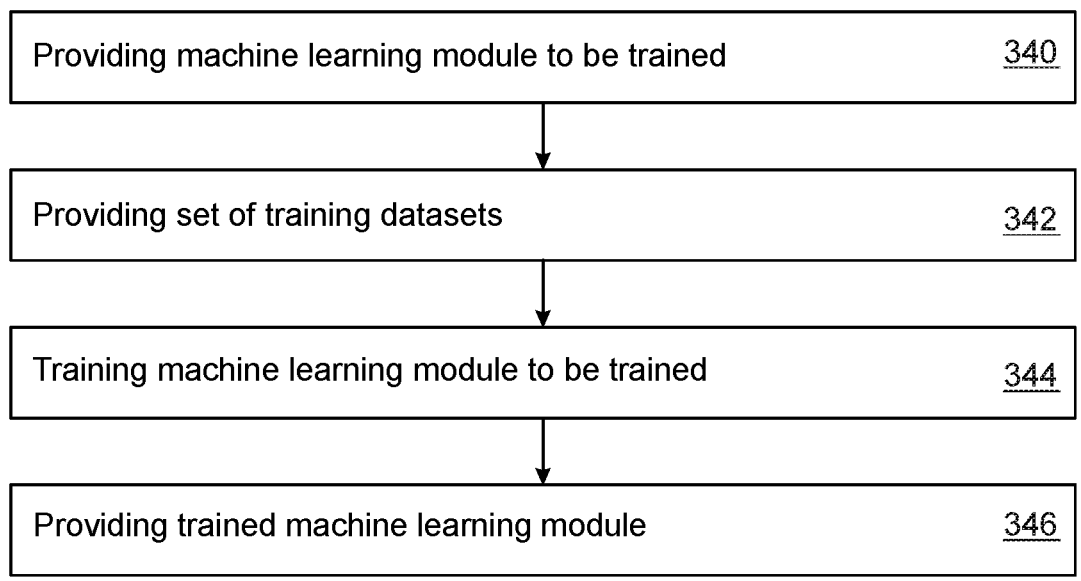
Figure 17:
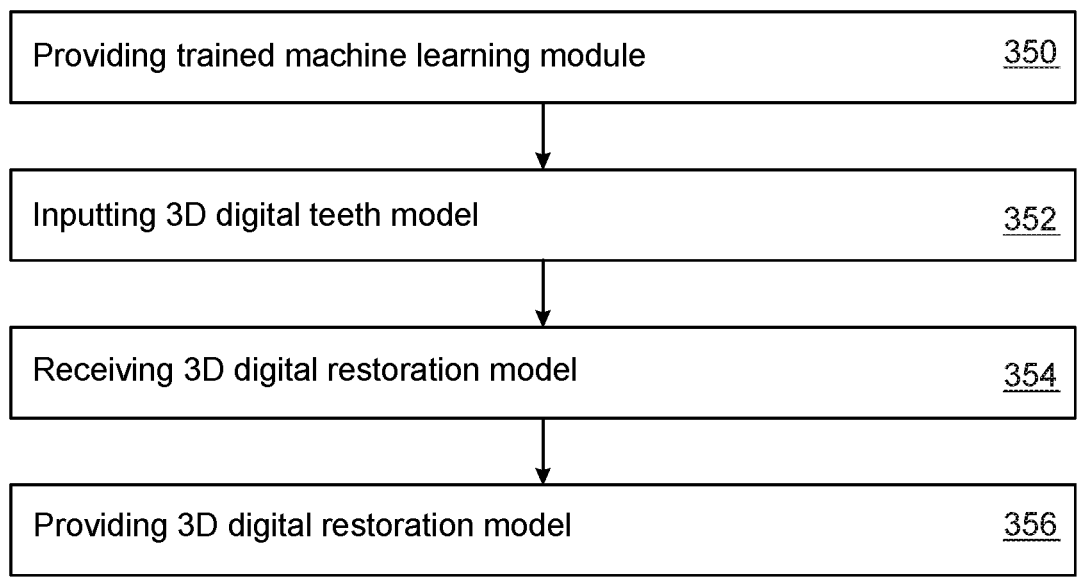

FIG. 5A-C show different exemplary embodiments of restoration forms;

FIG. 6 shows an exemplary restoration form attached to an exemplary holding splint;

FIG. 7 shows the exemplary holding splint with the exemplary restoration form of FIG. 6;

FIG. 8 shows the exemplary restoration form of FIG. 6;

FIG. 9 shows an exemplary computer device for providing a holding splint;

FIG. 10 shows an exemplary computer device for providing a holding splint;

FIG. 11 shows an exemplary manufacturing system for manufacturing a holding splint;

FIG. 12 shows a flowchart illustrating an exemplary method for manufacturing a holding splint;

FIG. 13 shows a flowchart illustrating an exemplary method for manufacturing restoration forms;

FIG. 14 shows a flowchart illustrating an exemplary method for training a machine learning module to be trained;

FIG. 15 shows a flowchart illustrating an exemplary method for using the trained machine learning module of FIG. 11, FIG. 16 shows a flowchart illustrating an exemplary method for training a machine learning module to be trained; and FIG. 17 shows a flowchart illustrating an exemplary method for using the trained machine learning module of FIG. 13.

In the following similar features are denoted by the same reference numerals.

Figure 1:
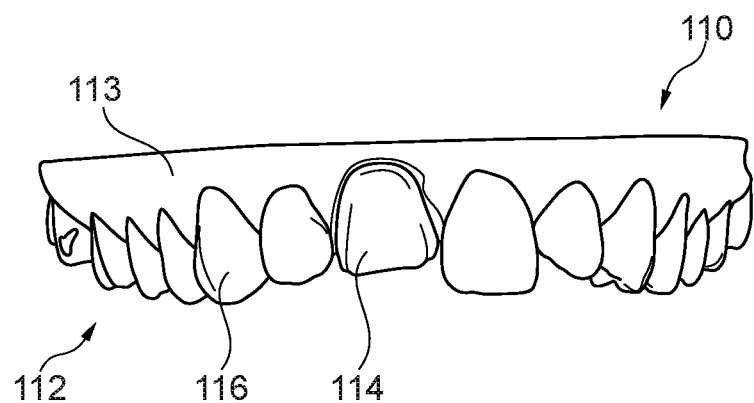

FIG. 1 shows an exemplary 3D digital teeth model 110 of the set of teeth 112 of a patient. The set of teeth 112 is, e.g., a maxillary dental arch. The set of teeth 112 comprises a tooth 114 to be restored. In the example illustrated in FIG. 1, the tooth to be restored is incisor. The tooth to be restored may as well be a canine. The tooth to be restored may, e.g., be a natural tooth of the patient, which has been worn down or has otherwise damaged such that it requires a restoration. The number of teeth to be restored could also be larger, e.g., two, three or more. The dental arch also comprises teeth 116 requiring no restoration. The examples illustrated in FIG. 1 to 4 may analogously be used for a mandibular arch comprising one or more teeth to be restored.

The 3D digital teeth model 110 may, e.g., be generated using scan data of the patient's oral cavity. For example, the patient's teeth in the oral cavity may be scanned using a scanner, e.g., an optical scanner. The achieved scan data may be used to provide the 3D digital teeth model 100 of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model 110. The 3D digital teeth model 100 may, e.g., further comprise soft tissue, like a gingiva 113, in addition to the hard tissue in form of the teeth, i.e., the 3D digital teeth model 110 may be provided in form of a 3D digital tissue model of at least a section of the patient's oral cavity.

Figure 2:
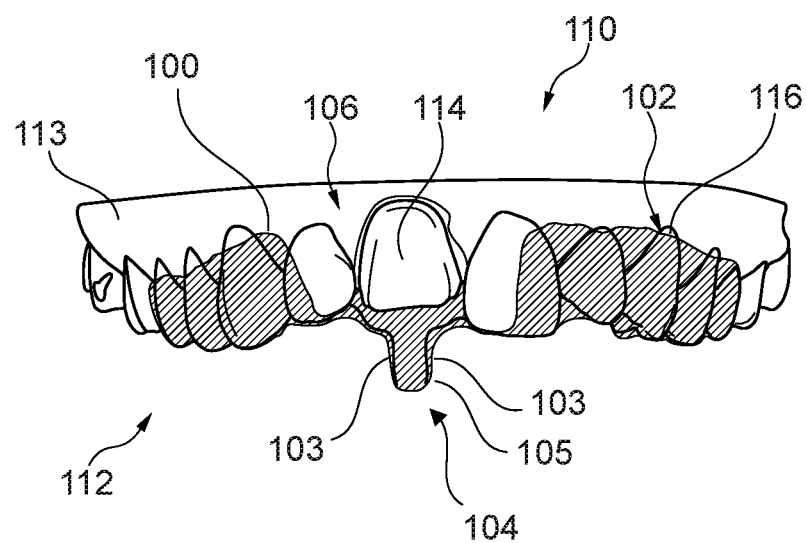
FIG. 2 shows an exemplary 3D digital model of a holding splint arranged on the 3D digital teeth model of FIG. 1.

FIG. 2 shows an exemplary 3D digital model of a holding splint 100 arranged on the 3D digital teeth model 110 of FIG. 1. The 3D digital model of the holding splint 100 may, e.g., be generated using the 3D digital teeth model 110. The 3D digital model of the holding splint 100 may be configured such that it comprises a plurality of receptions 102 for receiving teeth 116. The teeth 116 are teeth which do not require a restoration or which do not require a restoration using the holding splint defined by the 3D digital model of a holding splint 100. The receptions 102 are configured for fixating the holding splint defined by the 3D digital model of the holding splint 100 on a set of teeth, e.g., a dental arch of the patient as defined by the 3D digital teeth model 110 resembling a set of teeth of the patient in the patient's oral cavity. The receptions 102 may, e.g., be negatives of the teeth 116 to be received. Thus, the 3D digital model of the holding splint 100 defines a patient-individual holding splint adjusted to the patient's individual anatomical and/or aesthetical features.

For the tooth 114 to be restored, the 3D digital model of the holding splint 100 comprises a cutout 106 exposing the labial surface of the tooth 114 to be restore. On the exposed surface, a restoration is to be built within the patient's oral cavity. Thus, the cutout 106 ensured that those surfaces of teeth 114 to be restored are accessible for applying restoration material thereon as well as to arrange a restoration form 120 on the applied restoration material in order to shape the restoration material into predefined forms of restorations to be formed on the respective surfaces. The cutout 106 is formed, positioned and dimensioned such that it exposes and provides access to the labial surface of tooth 114 to be restored. The form, position and dimension of the cutout 106 may, e.g., be chosen based on the individual anatomical and/or aesthetical characteristic of the patient's dentition as defined by the 3D digital teeth model 110.

The holding splint as defined by the 3D digital model of the holding splint 100 further comprises a holding section 104 configured to hold a restoration form 120 at a predefined position relative to the tooth 114 to be restored. The position of the holding section 104 may thus depend on the relative position predefined for the restoration form 120 relative to the tooth 114 to be restored and thus relative to the 3D digital teeth model 110. The position of the holding section 104 may be chosen based on the form and position of the tooth 114 to be restored within the set of teeth 112 as defined by the 3D digital teeth model 110. Furthermore, the position of the holding section 104 may depend on the form of the restoration form 120 to be held at the predefined position. The holding section 104 may be arranged at an incisal, i.e., occlusal side of tooth 114 to be restored and thus at an incisal, i.e., occlusal side of cutout 106. In case of a maxillary tooth 114 to be restored, as shown in FIG. 2, the holding section 104 may be arranged below the cutout 106 and the maxillary tooth 114 to be restored. In case of a mandibular tooth to be restored, not shown in FIG. 2, the holding section may be arranged above the cutout and the respective mandibular tooth to be restored.

In case of a plurality of teeth are to be restored, the holding splint may be configured to hold a plurality of restoration forms. For this purpose, the holding splint may comprise a plurality of holding sections each configured to hold a single one of the restoration forms or the holding splint may comprise one or more holding sections each configured to hold a plurality of restoration forms. For example, a single holding section may be provided configured to hold all of the restoration forms. Furthermore, the holding splint may for this purpose comprise a plurality of cutouts each configured to expose a single one of teeth to be restored or the holding splint may comprise one or more cutouts each configured to expose a plurality of the teeth to be restored. For example, a single cutout may be provided configured to expose all of the teeth to be restored.

The holding section 104 is configured to establish a non-destructively detachable physical connection between the holding splint 100 and a restoration form in form of a snap-fit. The snap-fit is established by the holding section 104 receiving a holding extension of a restoration form. The snap-fit may, e.g., be formed using an elastic material for the holding section 104. The snap-fit comprises two opposing clamping elements 103, between which the holding extension 104 of a restoration form is clamped. The holding sections 104 further comprises a support section 105 configured for supporting the holding extension of the restoration form. The support section 105 comprises an elongated section corresponding to an elongated section of the restoration form. The holding extension of the restoration form may be arranged on the support section 105 in order support the restoration form in a predefined distance in front of the tooth 114 to be restored. The elongated section of the holding extension may extend parallel along the elongated section of the restoration form. The clamping elements 103 are arranged laterally on opposing lateral sides of the support section 105. The clamping elements 103 may, e.g., extend laterally along the support section 105. Further, the support section 105 may comprise a vertical support element configured to define a vertical position of the restoration form relative to the tooth 114 to be restored. For example, the vertical support element may be implemented in form of a protrusion, on which the restoration form may be arranged. The protrusion may, e.g., extend in vestibular, e.g., labial, direction. For example, the vertical support element may be arranged at a distal end of the support section 105 relative to the tooth 114 to be restored.

Figure 3:
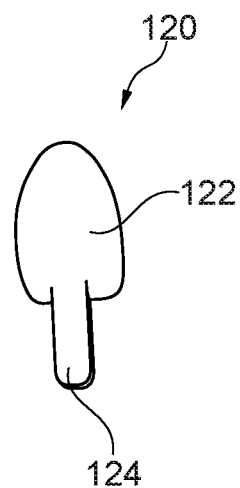
FIG. 3 shows an exemplary 3D digital form model.

FIG. 3 shows an exemplary 3D-digital form model 120 defining a restoration element. The restoration element defined by 3D-digital form model 120 has a spoon-like shape comprising a form section 122 with a shape of shallow bowl and a holding extension 124 with a shape of a handle. The form section 122 provides a negative of the predefined form into which the restoration material is to be shaped by the restoration form, i.e., the shape of the form section 122 defines the shape of the restoration formed on the tooth 114 to be restored. The holding extension 124 is configured to be received by the snap-fit of the holding section 104 of the holding splint as defined by the 3D digital model of the holding splint 100.

Figure 4:
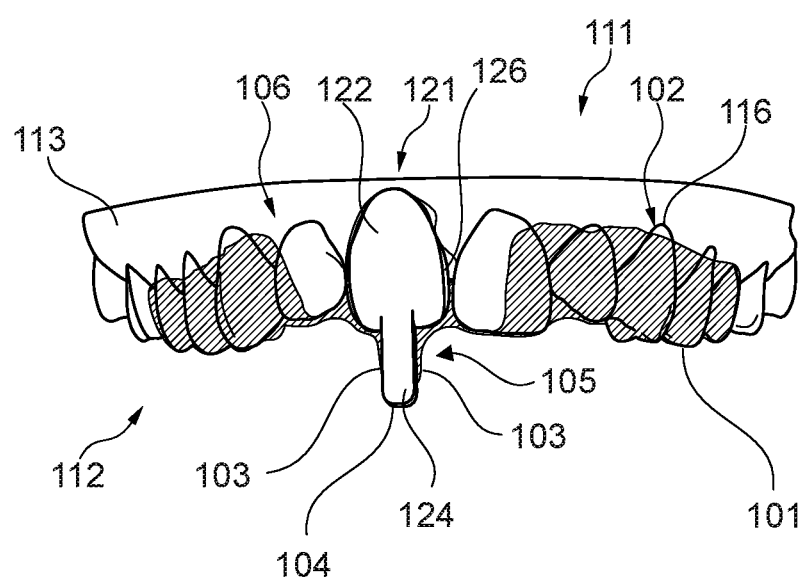
FIG. 4 shows an exemplary restoration form attached to an exemplary holding splint.

FIG. 4 shows a dental arch 111 of a patient as resembled by the teeth model 110 of FIG. 1. A holding splint 101 as defined by the 3D digital model of the holding splint 100 of FIG. 2 is arranged on a set of teeth 112 of the dental arch 111. In order to build a dental restoration on tooth 114 within the patient's oral cavity, a restoration material 126 is applied onto tooth 114. Tooth 114 to be restored is exposed by the cutout 106, when the holding splint 101 is arranged on the teeth 112. A restoration form 121 as defined by the 3D digital form model of FIG. 3 is arranged at the holding section 104 of the holding splint. The holding extension 124 is received by the snap-fit provided by the holding section 104 establishing non-destructively detachable physical connection between the restoration form 121 and the holding splint 101. The position of the restoration form 121 relative to the tooth 114 to be restored is defined by the position of the holding section 104 and the form of the holding extension 124. The holding extension 124 is clamped between the two opposing clamping elements 103 of the snap-fit holding the restoration form 121 at the predefined position relative to the tooth 114. The clamping elements 103 extend laterally along the support section 105 and thus along the holding extension 124 arranged on the support section 105 in order to establish the non-destructively detachable physical connection using the snap-fit. Further, the support section 105 may comprise a vertical support element configured to define the vertical position of the restoration form 121 relative to the tooth 114 to be restored. The vertical position of the form section 122 relative to the tooth 114 to be restored may depend on the relative position of the vertical support element relative to the tooth 114 and the length of the holding extension 124. The holding extension 124 may be arranged on the support section 105 such that the vertical support element is positioned at a distal end of the holding extension 124 from the point of view of the tooth 114 to be restored. The vertical support element may block a path of the holding extension 124 on the support section 105 away from the tooth 114 to be restored. Thus, when the holding extension 124 is arranged in contact with the vertical support element on the support section 105, the restoration form 121 is in the correct predefined position relative to the tooth 114.

The form section 122 of the restoration form 121 held by the holding splint 101 shapes the restoration material 126 on the labial surface of tooth 114 into the predefined form of the restoration to be formed on tooth 114. The form section 122 of the restoration form 121 may be pressed onto the restoration material 126, when the holding extension 124 of restoration form 121 is inserted into the snap-fit provided by the holding section 104. Thus, the dental restoration material 126 may, e.g., be applied in form of a paste, which is pressed into the predefined form by the restoration form 121.

The geometric form of the restoration, i.e., shape of the restored tooth, is defined by the form section 122 of the restoration 121. The form section 122 provides a negative of the restoration. Thus, the shape of the restored tooth is defined by a surface of the form section 122 facing the labial surface of the tooth 114 to be restored. The distance between the form section 122 of the restoration form 121 held in a predefined position relative to tooth 114 by the holding section 104 of the holding splint 101 and tooth 114 to be restored defines the thickness of the restoration being formed. The clearance between the form section 122 and the labial surface of tooth 114, which is filled with the restoration material 126, resembles the form of the restoration being formed. In other words, the form section 122 in combination with tooth 114 provide a matrix for forming the restoration to be built on tooth 114. Shape, thickness, and size of the clearance may correspond to shape, thickness and/or size of the restoration to be formed.

The amount of restoration material 126 applied onto the labial surface of tooth 114 may be, e.g., slightly, larger than the amount of restoration material 126 necessary to form the restorations, i.e., to fill the clearance. Excessive restoration material 126 may be press laterally out of the form section 122 of the restoration form 121, when the restoration form 121 is fixated in the predefined position relative to tooth 114 using a holding section 104 of the holding splint 101 and form section 122 is pressed onto the restoration material 126. The excessive restoration material 126 may be removed later on. By adjusting the amount of restoration material 126 applied to the teeth to be restored to only slightly exceed the amount of restoration material 126 required to restore tooth 114, the amount of excessive restoration material 126 to be removed later on may be minimized.

After the restoration material 126 shaped into the predefined form using the form section 122 of the restoration form 121 has been cured, the restoration form 121 may be removed. Furthermore, the holding splint 101 may be removed. Finally, tooth 114 with the cured restoration material 126 may be finished, e.g., excessive restoration material 126 may be removed and/or the cured restoration material 126 may be polished.

In case of a plurality of teeth to be restored, a single holding splint may be provided configured for holding a plurality of restoration forms configured for restoring the plurality of teeth to be restored. Alternatively, a plurality of holding splints may be provided, each of the holding splints configured for holding one or more of restoration forms configured for restoring one or more teeth of the plurality of teeth to be restored. For example, an individual holding splint may be provided for each of the teeth to be restored. Each of the individual holding splints is configured to hold a single restoration form configured for restoring one of the teeth of the plurality of teeth to be restored.

FIG. 5A to 5C shows different exemplary embodiments of restoration forms 121. The restoration form 121 of FIG. 5A is, e.g., defined by the 3D digital form model 120 of FIG. 3. The restoration forms 121 is configured to restore a single tooth to be restored. The restoration form 121 comprises a single form section 122 providing a negative of the form of the restoration to be formed using the restoration forms 121. Furthermore, the restoration form 121 comprises a single holding extension 124 configured to be held by a holding section of the holding splint in a predefined position relative to the tooth to be restored, e.g., using a snap-fit. Alternatively, the restoration form 121 may comprise more than one holding extension 124. For example, the restoration form 121 may comprise two holding extensions extending parallel to each other. These two holding extensions may, e.g., be held by two snap-fits provided by a holding section of the holding splint.

As shown in FIG. 5B, alternatively to providing a single restoration form 121 for each tooth to be restored, combinations of two or more restoration forms 121 may be provided for restoring two or more teeth. This may, e.g., be advantages for restoring neighboring teeth. The combination of restoration forms 121 shown in FIG. 5B comprises two restoration forms 121 and may be configured for restoring two neighboring teeth. The two form sections 122 each provide a negative of a form of a restoration for a tooth to be restored. The two form sections 122 are connected with each other. For example, the restoration forms 121 and in particular the two form sections 122 may be formed integrally as one continuous piece. For example, each of the two restoration forms 121 comprises a holding extension 124. These holding extensions 124 may each be held by a snap-fits provided by one or more, e.g., two, holding sections of the holding splint.

FIG. 5C shows a further example of a combination of restoration forms 121. In case of a combination of restoration forms 121, not each one of the restoration forms 121 may be required two comprise a holding extension 124 in order to ensure a sufficient support of the form section 122 of the combination of restoration forms 121. The form section 122 may be connected with each other, thereby supporting each other. In case of FIG. 5C, an exemplary combination of three restoration forms 121 with three form sections 122 and two holding extensions 124 is shown. The three form sections 122 each provide a negative of a form of a restoration for a tooth to be restored. The three form sections 122 are connected with each other. For example, the restoration forms 121 and in particular the three form sections 122 may be formed integrally as one continuous piece. The combination of restoration forms shown in FIG. 5C may, e.g., be configured for restoring three neighboring teeth. For example, two of the three restoration forms 121 each comprise a holding extension 124. These holding extensions 124 may each be held by a snap-fits provided by one or more, e.g., two, holding sections of the holding splint. The two holding extensions 124 may be used to hold the three restoration forms 121 each in a predefined position relative to a tooth to be restored using the respective restoration form 121.

FIG. 6 shows another exemplary restoration form 121 attached to another exemplary holding splint 101. The holding splint 101 with the restoration form 121 is arranged on a dental arch 111 comprising a set of teeth 112 of a patient. The holding splint 101 may be configured such that it comprises a plurality of receptions 102 for receiving teeth 116. The teeth 116 are teeth which do not require a restoration or which do not require a restoration using the holding splint 101. The receptions 102 are configured for fixating the holding splint 101 on a set of teeth 112 in the patient's oral cavity, e.g., a dental arch 111 of the patient. The receptions 102 may, e.g., be negatives of the teeth 116 to be received. Thus, the holding splint 101 defines a patient-individual holding splint adjusted to the patient's individual anatomical and/or aesthetical features.

For the tooth 114 to be restored, the holding splint 101 comprises a cutout 106 exposing the tooth 114 to be restore. On the exposed tooth 114, a restoration is to be built within the patient's oral cavity. Thus, the cutout 106 ensured that those surfaces of teeth 114 to be restored are accessible for applying restoration material thereon as well as to arrange a restoration form 121 on the applied restoration material in order to shape the restoration material into a predefined form of a restoration to be formed on the surfaces of teeth 114. The cutout 106 is formed, positioned and dimensioned such that it exposes and provides access to tooth 114 to be restored. The form, position and dimension of the cutout 106 may, e.g., be chosen based on the individual anatomical and/or aesthetical characteristic of the patient's dentition.

The holding splint 101 shown in FIG. 6 further comprises two holding sections 104 configured to hold a restoration form 120 at a predefined position relative to the tooth 114 to be restored. The positions of the holding sections 104 may thus depend on the relative position predefined for the restoration form 121 relative to the tooth 114 to be restored. The positions of the holding sections 104 may be chosen based on the form and position of the tooth 114 to be restored within the set of teeth 112. Furthermore, the positions of the holding sections 104 may depend on the form of the restoration form 121 to be held at the predefined position. The holding sections 104 may be arranged, e.g., at an occlusal side of neighboring teeth of the tooth 114 to be restored.

The holding sections 104 are configured to establish non-destructively detachable physical connections between the holding splint 101 and the restoration form 121, e.g., in form of a snap-fit. For example, the holding sections 104 may be negatives of the holding extensions 124. The snap-fit is established by the holding sections 104 receiving holding extensions 124 of the restoration form 121. The snap-fit may, e.g., be formed using an elastic material for the holding section 104. The snap-fits may, e.g., comprise clamping elements, between which the holding extensions 124 of the restoration form 121 are clamped. For example, the holding extensions 124 may lateral holding extensions arranged on each approximal side of the restoration form 121. The lateral holding extension 124 may be extensions of an occlusal section of the restoration form 121. The lateral holding extension 124 may, e.g., be formed like wings.

The holding splint 101 may, e.g., be formed integrally as one part extending on both approximal sides of the restoration form 121. Alternatively, the holding splint 101 may, e.g., comprise at least separate two parts, each part being configured to be arranged on one of the two approximal sides of the restoration form 121. The two separate parts may be arranged on both sides spaced apart from each other by the cutout 106.

FIG. 7 shows the exemplary holding splint 101 with the exemplary restoration form 121 of FIG. 6. FIG. 8 shows the exemplary restoration form 121 of FIG. 6.

FIG. 9 shows a schematic diagram of an exemplary computer device 10 for providing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 9, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a 3D digital teeth model of the set of teeth in the patient's oral cavity, which comprises one or more teeth to be restored. The 3D digital teeth model may be received by the computer device 10. Memory 28 may, e.g., include scan data of a patient's mouth from an intraoral scan or from a scan of a classical mold/impression, e.g., providing information about the surface structure of the patient's intraoral tissue comprising the one or more teeth to be reconstructed. The scan data may comprise scan data of the one or more teeth to be restored.

Memory 28 may, e.g., include a one or more 3D digital form models of the one or more restoration forms received or generated by the computer device 10. Memory 28 may, e.g., include a trained machine learning module configured to provide the 3D digital form models as output in response to receiving the 3D digital teeth model as input and/or a trained machine learning module being configured to provide the 3D digital restoration model as output in response to receiving the 3D digital teeth model as input. The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as the training datasets with training data. The machine learning module to be trained may, e.g., be an untrained machine learning module, a pre-trained machine learning module or a partially trained machine learning module. Memory 28 may, e.g., include a tooth library of artificial teeth and/or a form library of restoration forms. Memory 28 may, e.g., include a 3D digital restoration model comprising restorations of one or more teeth to be restored. The 3D digital restoration model may, e.g., have been received by the computer device 10 or generated by the computer device 10. Memory 28 may include at least one program product having a set of program modules, e.g., at least one program module, configured to plan restorations of one or more teeth of 3D digital teeth model to be restored. Memory 28 may, e.g., further include program modules configured for generating 3D digital form models and/or a 3D digital restoration model.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may be configured for generating the 3D digital model of the holding splint as template for manufacturing the holding splint. Program modules 42 may be configured for 3D digital form models and/or a 3D digital restoration model. One of the program modules 42 may, e.g., be configured to use the aforementioned trained machine learning module. One of the program modules 42 may, e.g., be configured to train the aforementioned machine learning module to be trained. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 9 may be configured for providing a 3D digital model of the holding splint as template for manufacturing the holding splint. The computer device 10 may be a standalone computer with no network connectivity that may receive data to be processed through a local interface. The data received by computer device 10 may for example comprise scan data of a patient's oral cavity from an intraoral scan or from a scan of a classical mold/impression, e.g., providing information about the surface structure of the patient's intraoral tissue comprising the one or more teeth to be restored. This data may be used to provide a 3D digital teeth model of the set of teeth in the patient's oral cavity comprising the one or more teeth to be restored. Alternatively, the data received may, e.g., comprise the 3D digital teeth model. The 3D digital teeth model is used to generate the 3D digital model of the holding splint. In addition, one or more 3D digital form models may be provided and used for generating the 3D digital model of the holding splint. The data received by computer device 10, e.g., include a tooth library of artificial teeth and/or a form library of restoration forms.

The data received by computer device 10 may for example comprise a machine learning module to be trained. The machine learning module to be trained may, e.g., be an untrained machine learning module, a pre-trained machine learning module or a partially trained machine learning module. The data received by computer device 10 may for example comprise training datasets with training data, e.g., for training the machine learning module to be trained for providing the 3D digital form models as output in response to receiving the 3D digital teeth model as input. The machine learning module to be trained may, e.g., be trained for providing the 3D digital restoration model as output in response to receiving the 3D digital teeth model as input. The data received by computer device 10 may for example comprise a trained machine learning module configured to provide the 3D digital form models as output in response to receiving the 3D digital teeth model as input and/or a trained machine learning module being configured to provide the 3D digital restoration model as output in response to receiving the 3D digital teeth model as input.

The 3D digital form models may e.g., be generated using the 3D digital teeth model. Such operation may, however, likewise be performed using a computer device that is connected to a network such as a communications network and/or a computing network.

FIG. 10 shows an exemplary computer device 10 for providing a 3D digital model 100 of a holding splint as template for manufacturing the holding splint. The holding splint is configured for being arranged in a patient's oral cavity on a set of teeth resembled by the 3D digital teeth model 110. The holding splint comprises one or more holding sections configured to hold the one or more restoration forms defined by the one or more 3D digital form models 120 in order to shape restoration material applied onto one or more surfaces of the one or more teeth to be restored into a predefined form of the teeth to be restored. The computer device 10 may, e.g., be configured as shown in FIG. 9. The computer device 10 may comprise a hardware component 54 comprising one or more processors as well as a memory storing machine-executable program instructions. Execution of the program instructions by the one or more processors may cause the one or more processors to control the computer device 10 to provide a holding splint for holding one or more restoration forms.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the generating and providing of the 3D digital model 100 of the holding splint as template for manufacturing the holding splint. Furthermore, the control elements 52 may, e.g., be used to generate, adjust and/or modify a 3D digital teeth model of a set of teeth in the patient's oral cavity, 3D digital form models of restoration forms and/or a 3D digital restoration model.

Furthermore, the computer device 10 may for example comprise a scanner 59, e.g., an optical scanner, for acquiring scan data of a patient's intraoral tissue. The scan data may, e.g., be direct scan data of a patient's mouth from an intraoral scan or indirect scan data from a scan of a classical mold/impression, e.g., providing information about the surface structure of the patient's intraoral tissue comprising the one or more teeth to be reconstructed. This data may be used to provide a 3D digital teeth model of the set of teeth in the patient's oral cavity comprising the one or more teeth to be reconstructed.

FIG. 11 shows an exemplary manufacturing system 11 for manufacturing a holding splint 101 using the 3D digital model 100 of the holding splint as template. The manufactured holding splint 101 is a physical copy of the template 100. The holding splint 101 may be used to hold restoration forms 121 in predefined positions relative to teeth within a patient's oral cavity to be restored. Restoration material is applied onto surfaces of the teeth to be restored and shaped into a predefined form by the restoration forms 121, which are arranged and held in the predefined positions using the holding splint 100. The manufacturing system 11 may further be configured for manufacturing one or more restoration forms 121 using 3D digital form models 120 as templates. The manufactured restoration forms 121 are physical copies of the templates 120.

The manufacturing system 11 may comprise the computer device 10 of FIG. 9. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78 may be provided using a holding device 74 and cut into a desired shape and size of the one or more elements to be manufactured, e.g., a restoration form 121 and/or a holding splint 101, using the one or more machining tools 72 for executing a controlled material-removal process. The machining tool 72 may, e.g., be a milling tool. A 3D digital model, e.g., the 3D digital form model 120 or the 3D digital model 100 of a holding splint, may provide a template for the element being manufactured using the machining device 70.

For example, the manufacturing system 11 may comprise a manufacturing device in form of a 3D printing device 60. The 3D printing device 60 may be controlled by the computer device 10 and configured to print one or more elements to be manufactured, e.g., a holding splint 101 and/or a restoration form 121. The 3D printing device 60 may comprise a printing element 62 configured to print the respective element, like the holding splint 101 and/or restoration form 121, layer by layer. The printing element 62 may, e.g., comprise a nozzle configured for distributing printing material. A 3D digital model, e.g., the 3D digital model 100 of a holding splint and/or the 3D digital form model 120, may provide a template of the physical element manufactured using the 3D printing device 60.

FIG. 12 shows an exemplary method for manufacturing a holding splint for holding one or more restoration forms. The holding splint is configured for being arranged in a patient's oral cavity on a set of teeth comprising one or more teeth to be restored. The holding splint comprises one or more holding sections configured to hold the one or more restoration forms in order to shape restoration material applied onto one or more surfaces of the one or more teeth to be restored into a predefined form using the one or more restoration forms.

In block 300, a 3D digital teeth model of the set of teeth in the patient's oral cavity comprising the one or more teeth to be restored is provided. The 3D digital teeth model may be received via a network, read from a storage medium or generated using scan data of the tissue. The scan data may, e.g., be scanned data acquired using an optical scanner. The scan data may be scanned data resulting from an intraoral scan, from a scan of an impression of the natural tissue, in particular the teeth, or from a scan from of a physical tissue model generated using the impression of the natural tissue, in particular the teeth.

In block 302, one or more 3D digital form models of the one or more restoration forms to be held by the holding splint are provided. The 3D digital form models may be received via a network, read from a storage medium or generated using the 3D digital teeth model. For example, the 3D digital teeth model may be used to generate a 3D digital restoration model comprising restorations of the one or more teeth to be restored. The 3D digital form models may be generated using the 3D digital restoration model. The 3D digital form models may define negatives of restored sections of the restorations defined by the 3D digital restoration model. Furthermore, predefined positions of the 3D digital form models relative to the teeth to be restored may be defined. The predefined positions may be defined such that the negatives provided by form sections of the 3D digital form models arranged in the respective predefined positions form fit on the restorations defined by the 3D digital restoration model.

In block 304, a 3D digital model of the holding splint is generated. For generating the 3D digital model of the holding splint the 3D digital teeth model and the one or more 3D digital form models may be used. The holding splint defined by the 3D digital model comprises one or more tooth receptions for receiving one or more teeth, when being arranged on the set of teeth within the oral cavity of the patient. The tooth receptions may, e.g., be negatives of the teeth to be received within the respective receptions. The holding splint may further comprise one or more cutouts. The cutouts expose surfaces of the one or more teeth to be restored, on which the restorations are to be built. By exposing the surfaces, restoration material can be arranged on the respective surfaces, while the holding splint is arranged on the teeth. Furthermore, one or more restoration forms can be attached to the holding splint. The being held by the holding splint, the attached restoration forms may be arranged at predefined positions relative to the teeth to be restored and shape the restoration material applied before into predefined forms resembling the restorations to be built.

In block 306, the 3D digital model of the holding splint is provided as template for manufacturing the holding splint. In block 308, the holding splint is manufactured using the 3D digital model of the holding splint as template. For example, machining, 3D printing or casting may be used for manufacturing the holding splint. The manufactured holding splint is a physical copy of the template.

FIG. 13 shows an exemplary method for manufacturing one or more restoration forms to be held by the holding splint in order to shape restoration material into predefined forms of restoration. In block 310, a 3D digital teeth model of the set of teeth in the patient's oral cavity comprising the one or more teeth to be restored is provided. The 3D digital teeth model may be received via a network, read from a storage medium or generated using scan data of the tissue. The scan data may, e.g., be scanned data acquired using an optical scanner. The scan data may be scanned data resulting from an intraoral scan, from a scan of an impression of the natural tissue, in particular the teeth, or from a scan from of a physical tissue model generated using the impression of the natural tissue, in particular the teeth.

In block 312, the 3D digital teeth model is used to generate a 3D digital restoration model comprising restorations of the one or more teeth to be restored. For example, the 3D digital teeth models of the teeth to be restored may be segmented and replaced by 3D digital models of restored teeth. The 3D digital models of restored teeth may, e.g., be generated from scratch. The 3D digital models of restored teeth may, e.g., be generated using 3D digital models of artificial teeth selected from a tooth library. The 3D digital models of restored teeth may, e.g., be generated using 3D digital models of neighboring teeth, which may be adjusted to be used as 3D digital models of restored teeth. The 3D digital models of restored teeth may, e.g., be generated using 3D digital models of antagonists, which may be mirrored and adjusted to be used as 3D digital models of restored teeth.

In block 314, 3D digital form models may be generated using the 3D digital restoration model. The 3D digital form models may define negatives of restored sections of the restorations defined by the 3D digital restoration model. Furthermore, predefined positions of the 3D digital form models relative to the teeth to be restored may be defined. The predefined positions may be defined such that the negatives provided by form sections of the 3D digital form models arranged in the respective predefined positions form fit on the restorations defined by the 3D digital restoration model.

In block 316, the 3D digital form models are provided as templates for manufacturing the restoration forms to be held by the holding splint. In block 318, the restoration forms are manufactured using the 3D digital form models as templates. For example, machining, 3D printing or casting may be used for manufacturing the restoration forms. The manufactured restoration forms are physical copies of the templates.

FIG. 14 shows an exemplary method for providing a trained machine learning module trained to provide one or more 3D digital form models as output in response to receiving a 3D digital teeth model as input. In block 320, a machine learning module to be trained is provided. The machine learning module to be trained may, e.g., be an untrained machine learning module, a pre-trained machine learning module or a partially trained machine learning module. In block 322, a set of training datasets is provided for training the machine learning module to be trained. Each training dataset may comprise a 3D digital training teeth model and one or more 3D digital training form models. In addition, further data may be provided as input. For example, the training input data provided by the training datasets may further comprise identifiers identifying the teeth to be restored. Furthermore, the training input data may comprise a definition of a minimum thickness required by the restoration material intended to be used for restoring the teeth to be restored. Furthermore, the training input data may comprise one or more of the following data, in case the respective data is not comprised by the 3D digital training teeth model: a target color of the one or more teeth to be restored, e.g., defined by the color of one or more neighboring teeth and/or antagonists provided by additional scan data of a patient's teeth or by a color selected from a set of predefined colors, a target degree of transparency of the one or more teeth to be restored, e.g., defined by a transparency of one or more neighboring teeth and/or antagonists provided by additional scan data of a patient's teeth or by a transparency, e.g., selected from a set of predefined transparencies.

In block 324, the machine learning module to be trained provided in block 320 using the set of training datasets provided in block 322. The machine learning module to be trained is trained to provide the one or more 3D digital training form models of the training datasets as output in response to receiving the 3D digital training teeth model of the respective training datasets as input. In block 326, the trained machine learning module resulting from block 324 is provided. The provided trained machine learning module may be used to provide one or more 3D digital form models as output in response to receiving a 3D digital teeth model as input. The resulting trained machine learning module may be configured to provide 3D digital restoration models as output with one or more restorations with suitable characteristics to complete the patient's dentition. The restorations may have a thickness relative to the teeth to be restored as defined by the 3D teeth model configured to be equal or larger than a minimum thickness required by the restoration material intended to be used. Furthermore, the thickness may be configured to achieve a target color of the restoration, e.g., defined by the color of one or more neighboring teeth and/or antagonists provided by the 3D digital teeth model or by additional scan data of the patient's teeth. Alternatively, a color, e.g., selected from a set of predefined colors, may be provided as an additional input to the machine learning module. The thickness may be configured to achieve a target degree of transparency of the restoration, e.g., defined by the degree of transparency of one or more neighboring teeth and/or antagonists provided by the 3D digital teeth model or by additional scan data of the patient's teeth. Alternatively, a degree of transparency, e.g., selected from a set of predefined colors, may be provided as an additional input to the machine learning module. The thickness may be configured to achieve a target form of the restored tooth. The target form may, e.g., be determined using the forms of the teeth of the patient as defined by the 3D digital teeth model. For example, the forms of one or more neighboring teeth and/or antagonists provided by the 3D digital teeth model may be used to determine the target form.

FIG. 15 shows an exemplary method for using a trained machine learning module for providing one or more 3D digital form models as output in response to receiving a 3D digital teeth model as input. In block 330, the trained machine learning module is provided. The providing may comprise a training of a machine learning module to be trained as shown in FIG. 14. The machine learning module to be trained may, e.g., be an untrained machine learning module, a pre-trained machine learning module or a partially trained machine learning module. The trained machine learning module may be configured to provide one or more 3D digital form models as output in response to receiving a 3D digital teeth model as input. In block 332, the 3D digital teeth model is input into the trained machine learning module. Thus, the trained machine learning module receives the 3D digital teeth model as input. In addition, further data may be provided as input. For example, the training input data provided by the training datasets may further comprise identifiers identifying the teeth to be restored. Furthermore, the training input data may comprise a definition of a minimum thickness required by the restoration material intended to be used for restoring the teeth to be restored. Furthermore, the training input data may comprise one or more of the following data, in case the respective data is not comprised by the 3D digital training teeth model: a target color of the one or more teeth to be restored, e.g., defined by the color of one or more neighboring teeth and/or antagonists provided by additional scan data of a patient's teeth or by a color selected from a set of predefined colors, a target degree of transparency of the one or more teeth to be restored, e.g., defined by a transparency of one or more neighboring teeth and/or antagonists provided by additional scan data of a patient's teeth or by a transparency, e.g., selected from a set of predefined transparencies.

In block 334, the 3D digital form models are received from the trained machine learning module as output in response to the inputting of the 3D digital teeth model. Thus, the trained machine learning module outputs the 3D digital form models in response to the receiving of the 3D digital teeth model. In block 336, the output 3D digital form models are provided, e.g., for generating restoration forms using the 3D digital form models as templates. The resulting trained machine learning module may be configured to provide 3D digital form models as output, which each define a clearance between the 3D digital form model and a tooth to be restored with suitable characteristics to complete the patient's dentition by patient-individual restoring the tooth to be restored. The clearance may have a thickness configured to be equal or larger than a minimum thickness required by the restoration material intended to be used. Furthermore, the thickness may be configured to achieve a target color of the restoration, e.g., defined by the color of one or more neighboring teeth and/or antagonists provided by the 3D digital teeth model or by additional scan data of the patient's teeth. Alternatively, a color, e.g., selected from a set of predefined colors, may be provided as an additional input to the machine learning module. The thickness may be configured to achieve a target degree of transparency of the restoration, e.g., defined by the degree of transparency of one or more neighboring teeth and/or antagonists provided by the 3D digital teeth model or by additional scan data of the patient's teeth. Alternatively, a degree of transparency, e.g., selected from a set of predefined colors, may be provided as an additional input to the machine learning module. The thickness may be configured to achieve a target form of the restored tooth. The target form may, e.g., be determined using the forms of the teeth of the patient as defined by the 3D digital teeth model. For example, the forms of one or more neighboring teeth and/or antagonists provided by the 3D digital teeth model may be used to determine the target form.

FIG. 16 shows an exemplary method for providing a trained machine learning module trained to provide a 3D digital restoration model as output in response to receiving a 3D digital teeth model as input. In block 340, a machine learning module to be trained is provided. The machine learning module to be trained may, e.g., be an untrained machine learning module, a pre-trained machine learning module or a partially trained machine learning module. In block 342, a set of training datasets is provided for training the machine learning module to be trained. Each training dataset may comprise a 3D digital training teeth model and a 3D digital training restoration model. For example, the training input data provided by the training datasets may further comprise one or more of the following in addition to the 3D digital training teeth model: a target color of the one or more teeth to be restored, e.g., defined by the color of a neighboring tooth or by a selected color from set of predefined colors, target degrees of transparency of the restored layers of the one or more teeth to be restored, e.g., defined by the degree of transparency of layers of a neighboring tooth, a minimum thickness required the restoration material intended to be used for restoring the teeth to be restored.

In block 344, the machine learning module to be trained provided in block 340 using the set of training datasets provided in block 342. The machine learning module to be trained is trained to provide the 3D digital training restoration models of the training datasets as output in response to receiving the 3D digital training teeth model of the respective training datasets as input. In block 346, the trained machine learning module resulting from block 344 is provided. The provided trained machine learning module may be used to provide a 3D digital restoration model as output in response to receiving a 3D digital teeth model as input.

FIG. 17 shows an exemplary method for using a trained machine learning module for providing a 3D digital restoration model as output in response to receiving a 3D digital teeth model as input. In block 350, the trained machine learning module is provided. The providing may comprise a training of a machine learning module to be trained as shown in FIG. 16. The trained machine learning module may be configured to provide a 3D digital restoration model as output in response to receiving a 3D digital teeth model as input. In block 352, the 3D digital teeth model is input into the trained machine learning module. Thus, the trained machine learning module receives the 3D digital teeth model as input. In addition, further data may, e.g., be provided as input to the trained machine learning module depending on the training of the machine learning module. For example, the input provided to the machine learning module may further comprise a target color of the one or more teeth to be restored, e.g., defined by the color of a neighboring tooth or by a selected color from set of predefined colors, target degrees of transparency of the restored layers of the one or more teeth to be restored, e.g., defined by the degree of transparency of layers of a neighboring tooth, a minimum thickness required the restoration material intended to be used for restoring the teeth to be restored.

In block 354, a 3D digital restoration model is received from the trained machine learning module as output in response to the inputting of the 3D digital teeth model. Thus, the trained machine learning module outputs the 3D digital restoration model in response to the receiving of the 3D digital teeth model. In block 356, the output 3D digital restoration model is provided, e.g., for generating a 3D digital model of a holding splint to be used as a template to manufacture a holding splint.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user Interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms, the method comprising:
providing a 3D digital teeth model of the set of teeth in the patient's oral cavity comprising the one or more teeth to be restored,
providing one or more 3D digital form models of the one or more restoration forms to be held by the holding splint,
generating using the 3D digital teeth model and the one or more 3D digital form models a 3D digital model of the holding splint, the holding splint comprising one or more tooth receptions for receiving one or more teeth, when being arranged on the set of teeth, the holding splint comprising one or more cutouts for arranging the one or more restoration forms at the one or more surfaces of the one or more teeth to be restored, when being held by the one or more holding sections,
providing the 3D digital model of the holding splint as template for manufacturing the holding splint.

2. The method of feature combination 1, further comprising manufacturing the holding splint using the 3D digital model of the holding splint as template, the manufactured holding splint being a physical copy of the template.

3. The method of feature combination 2, the holding splint being manufactured using at least one of the following: machining, 3D printing, casting.

4. The method of any of the preceding feature combinations, using a first trained machine learning module for providing the one or more 3D digital form models, the first trained machine learning module being configured to provide the 3D digital form models as output in response to receiving the 3D digital teeth model as input.

5. The method of feature combination 4, further comprising providing the first trained machine learning module, the providing of the first trained machine learning module comprising:
providing a first machine learning module to be trained,
providing a set of first training datasets for training the first machine learning module to be trained, each first training dataset comprising a first 3D digital training teeth model and a one or more first 3D digital training form models,
training the first machine learning module to be trained to provide the one or more first 3D digital training form models of the first training datasets as output in response to receiving the first 3D digital training teeth model of the respective first training datasets as input.

6. The method of any of feature combinations 1 to 3, the method further comprising:
generating using the 3D digital teeth model a 3D digital restoration model comprising restorations of the one or more teeth to be restored,
generating using the 3D digital restoration model the provided one or more 3D digital form models, the restoration forms comprising negatives of restored sections of the restorations of the one or more teeth to be restored.

7. The method of feature combination 6, using a second trained machine learning module for generating the 3D digital restoration model,
the second trained machine learning module being configured to provide the 3D digital restoration model as output in response to receiving the 3D digital teeth model as input.

8. The method of feature combination 7, further comprising providing the second trained machine learning module, the providing of the second trained machine learning module comprising:
providing a second machine learning module to be trained,
providing a set of second training datasets for training the second machine learning module to be trained, each second training dataset comprising a second 3D digital training teeth model and a second 3D digital training restoration model,
training the second machine learning module to be trained to provide the second 3D digital training restoration models of the second training datasets as output in response to receiving the second 3D digital training teeth model of the respective second training datasets as input.

9. The method of feature combinations 6 to 8, the restorations of the one or more teeth to be restored being patient-individual restorations, the one or more 3D digital models of the one or more restoration forms being one or more 3D digital models of one or more patient-individual restoration forms, the patient-individual restoration forms comprising negatives of patient-individual restored sections of the patient-individual restorations.

10. The method of feature combinations 6 to 8, the restorations of the one or more teeth to be restored being generic restorations, the generating of the 3D digital restoration model comprising replacing the one or more teeth to be restored by one or more generic teeth from a tooth library, the one or more 3D digital models of the one or more restoration forms being one or more 3D digital models of one or more generic restoration forms, the generating of the one or more 3D digital models of the one or more restoration forms comprising selecting one or more 3D digital models of the one or more generic restoration forms from a form library of generic restoration forms, the generic restoration forms of the form library comprising negatives of sections of the generic teeth from the tooth library.

11. The method of feature combinations 6 to 10, the generating of the 3D digital restoration model comprising replacing the one or more teeth to be restored by one or more natural teeth of the patient being mirrored.

12. The method of any of the preceding feature combinations, further comprising using the one or more 3D digital form models as templates for manufacturing the one or more restoration forms, each of the manufactured restoration forms being a physical copy of one of the templates.

13. The method of feature combination 12, the one or more restoration forms being manufactured using at least one of the following: machining, 3D printing, casting.

14. The method of any of the preceding feature combinations, the holding splint comprising a plurality of tooth receptions for receiving a plurality of the teeth.

15. The method of any of the preceding feature combinations, the holding splint comprising a single holding section for holding a single restoration form.

16. The method of feature combination 15, the holding splint comprising a single cutout for arranging the single restoration form at a single surface of a single tooth to be restored.

17. The method of any of the preceding feature combinations 1 to 14, the holding splint comprising a plurality of holding sections for holding a plurality of restoration forms.

18. The method of feature combination 17, the holding splint comprising a plurality of cutouts for arranging a plurality of restoration forms at a plurality of surfaces of a plurality of teeth to be restored.

19. The method of any of the preceding feature combinations, the one or more holding sections being configured to establishing one or more non-destructively detachable physical connections between the holding splint and the restoration forms in order to hold the one or more restoration forms in place.

20. The method of feature combination 19, the one or more non-destructively detachable physical connections being snap-fits established by the holding sections receiving holding extensions of the restoration forms.

21. The method of any of the preceding feature combinations, the one or more holding sections being configured to hold the one or more restoration forms in order to shape the restoration material applied onto one or more labial surfaces of the one or more teeth to be restored into the predefined form.

22. The method of any of the preceding feature combinations, the one or more restoration forms being veneer forms.

23. The method of any of the preceding feature combinations, the set of teeth being one of the following: a mandibular dental arch, a maxillary dental arch.

24. The method of feature any of the preceding feature combinations, the set of teeth comprising one or more.

25. The method of feature any of the preceding feature combinations, the set of teeth comprising one or more artificial teeth.

26. A computer program product for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms,
the computer program product comprising a computer readable storage medium having program instructions embodied therewith, the program instructions being executable by a processor of a computer device to cause the computer device to:
provide a 3D digital teeth model of the set of teeth in the patient's oral cavity comprising the one or more teeth to be restored,
provide one or more 3D digital form models of the one or more restoration forms to be held by the holding splint,
generate using the 3D digital teeth model and the one or more 3D digital form models a 3D digital model of the holding splint, the holding splint comprising one or more receptions for receiving one or more teeth, when being arranged on the set of teeth, the holding splint comprising one or more cutouts for arranging the one or more restoration forms at the one or more surfaces of the one or more teeth to be restored, when being held by the one or more holding sections,
provide the 3D digital model of the holding splint as template for manufacturing the holding splint.

27. The computer program product of feature combination 26, the program instructions further being executable to cause the computer device to:
generate using the 3D digital teeth model a 3D digital restoration model comprising restorations of the one or more teeth to be restored,
generate using the 3D digital restoration model the provided one or more 3D digital form models of the one or more restoration forms, the restoration forms comprising negatives of restored sections of the restorations of the one or more teeth to be restored.

28. A computer device for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms,
the computer device comprising a processor and a memory storing program instructions executable by the processor, execution of the program instructions by the processor causing the computer device to:

provide a 3D digital teeth model of the set of teeth in the patient's oral cavity comprising the one or more teeth to be restored, provide one or more 3D digital form models of the one or more restoration forms to be held by the holding splint, generate using the 3D digital teeth model and the one or more 3D digital form models a 3D digital model of the holding splint, the holding splint comprising one or more receptions for receiving one or more teeth, when being arranged on the set of teeth, the holding splint comprising one or more cutouts for arranging the one or more restoration forms at the one or more surfaces of the one or more teeth to be restored, when being held by the one or more holding sections, provide the 3D digital model of the holding splint as template for manufacturing the holding splint.

29. The computer device of feature combination 28, execution of the program instructions by the processor further causing the computer device to:

generate using the 3D digital teeth model a 3D digital restoration model comprising restorations of the one or more teeth to be restored, generate using the 3D digital restoration model the provided one or more 3D digital form models of the one or more restoration forms, the restoration forms comprising negatives of restored sections of the restorations of the one or more teeth to be restored.

30. A manufacturing system comprising the computer device of feature combination 25, the manufacturing system further comprising a manufacturing device configured to manufacture the holding splint, execution of the program instructions by the processor further causing the computer device to control the manufacturing device to manufacture the holding splint using the 3D digital model of the holding splint as template, the manufactured holding splint being a physical copy of the respective template.

31. The manufacturing system of feature combination 30, the manufacturing device further being configured to manufacture the one or more restoration forms using the 3D digital models of the one or more restoration forms as templates, each of the manufactured restoration forms being a physical copy of one of the respective templates.

32. The manufacturing system of any of feature combinations 30 to 31, the manufacturing system comprising at least one of the following: a machining device, a 3D printing device.

33. A holding splint for holding one or more restoration forms, the holding splint being configured for being arranged in a patient's oral cavity on a set of teeth comprising one or more teeth to be restored, the holding splint comprising one or more tooth receptions for receiving one or more teeth, when being arranged on the set of teeth, the holding splint comprising one or more holding sections configured to hold the one or more restoration forms in order to shape restoration material applied onto one or more surfaces of the one or more teeth to be restored into a predefined form using the one or more restoration forms, the holding splint comprising one or more cutouts for arranging the one or more restoration forms at the one or more surfaces of the one or more teeth to be restored, when being held by the one or more holding sections.

34. The holding splint of feature combination 33, the holding splint being equipped with the one or more restoration forms to be held by the holding splint.

35. The holding splint of feature combination 34, the one or more restoration forms being patient-individual restoration forms configured to apply the restoration material on the one or more surfaces of the one or more teeth to be restored into a predefined patient-individual form.

36. The holding splint of feature combination 34, the one or more restoration forms being generic restoration forms configured to apply the restoration material on the one or more surfaces of the one or more teeth to be restored into a predefined generic form.

LIST OF REFERENCE NUMERALS 10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 3D digital model of the holding splint
101 holding splint
102 reception
103 clamping element
104 holding section
105 support section
106 cutout
110 3D digital teeth model
111 intraoral tissue
112 teeth
113 gingiva
114 tooth to be restored
116 tooth
120 3D digital form model
121 restoration form
122 form section
124 holding extension
126 restoration material

The invention claimed is:

1. A computer-implemented method for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms, the one or more holding sections being configured to establish one or more non-destructively detachable physical connections between the holding splint and the restoration forms in order to hold the one or more restoration forms in place, the method comprising:
providing a 3D digital teeth model of the set of teeth in the patient's oral cavity comprising the one or more teeth to be restored,
providing one or more 3D digital form models of the one or more restoration forms to be held by the holding splint,
generating, using the 3D digital teeth model and the one or more 3D digital form models, a 3D digital model of the holding splint, the holding splint comprising one or more tooth receptions for receiving one or more teeth, when being arranged on the set of teeth, the holding splint comprising one or more cutouts for arranging the one or more restoration forms at the one or more surfaces of the one or more teeth to be restored, when being held by the one or more holding sections,
providing the 3D digital model of the holding splint as template for manufacturing the holding splint.

2. The method of claim 1, further comprising manufacturing the holding splint using the 3D digital model of the holding splint as template, the manufactured holding splint being a physical copy of the template.

3. The method of claim 2, the holding splint being manufactured using at least one of the following: machining, 3D printing, casting.

4. The method of claim 1, using a first trained machine learning module for providing the one or more 3D digital form models,
the first trained machine learning module being configured to provide the 3D digital form models as output in response to receiving the 3D digital teeth model as input.

5. The method of claim 4, further comprising providing the first trained machine learning module by:
providing a first machine learning module to be trained,
providing a set of first training datasets for training the first machine learning module to be trained, each first training dataset comprising a first 3D digital training teeth model and one or more first 3D digital training form models,
training the first machine learning module to be trained to provide the one or more first 3D digital training form models of the first training datasets as output in response to receiving the first 3D digital training teeth model of the respective first training datasets as input.

6. The method of claim 1, the method further comprising:
generating a 3D digital restoration model using the 3D digital teeth model, the 3D digital restoration model comprising restorations of the one or more teeth to be restored,
generating the one or more 3D digital form models using the 3D digital restoration model, the restoration forms comprising negatives of restored sections of the restorations of the one or more teeth to be restored.

7. The method of claim 6, using a second trained machine learning module for generating the 3D digital restoration model,
the second trained machine learning module being configured to provide the 3D digital restoration model as output in response to receiving the 3D digital teeth model as input.

8. The method of claim 7, further comprising providing the second trained machine learning module by:
providing a second machine learning module to be trained,
providing a set of second training datasets for training the second machine learning module to be trained, each second training dataset comprising a second 3D digital training teeth model and a second 3D digital training restoration model,
training the second machine learning module to be trained to provide the second 3D digital training restoration models of the second training datasets as output in response to receiving the second 3D digital training teeth model of the respective second training datasets as input.

9. The method of claim 6, the restorations of the one or more teeth to be restored being patient-individual restorations,
the one or more 3D digital models of the one or more restoration forms being one or more 3D digital models of one or more patient-individual restoration forms, the patient-individual restoration forms comprising negatives of patient-individual restored sections of the patient-individual restorations.

10. The method of claim 6, the restorations of the one or more teeth to be restored being generic restorations, the generating of the 3D digital restoration model comprising replacing the one or more teeth to be restored by one or more generic teeth from a tooth library,
the one or more 3D digital models of the one or more restoration forms being one or more 3D digital models of one or more generic restoration forms, the generating of the one or more 3D digital models of the one or more restoration forms comprising selecting one or more 3D digital models of the one or more generic restoration forms from a form library of generic restoration forms, the generic restoration forms of the form library comprising negatives of sections of the generic teeth from the tooth library.

11. The method of claim 6, the generating of the 3D digital restoration model comprising replacing the one or more teeth to be restored by one or more natural teeth of the patient being mirrored.

12. The method of claim 1, further comprising using the one or more 3D digital form models as templates for manufacturing the one or more restoration forms, each of the manufactured restoration forms being a physical copy of one of the templates.

13. The method of claim 12, the one or more restoration forms being manufactured using at least one of the following: machining, 3D printing, casting.

14. The method of claim 1, the holding splint comprising a plurality of tooth receptions for receiving a plurality of the teeth.

15. The method of claim 1, the holding splint comprising a single holding section for holding a single restoration form.

16. The method of claim 15, the holding splint comprising a single cutout for arranging the single restoration form at a single surface of a single tooth to be restored.

17. The method of claim 1, the holding splint comprising a plurality of holding sections for holding a plurality of restoration forms.

18. The method of claim 17, the holding splint comprising a plurality of cutouts for arranging a plurality of restoration forms at a plurality of surfaces of a plurality of teeth to be restored.

19. The method of claim 1, the one or more non-destructively detachable physical connections being snap-fits established by the holding sections receiving holding extensions of the restoration forms.

20. The method of claim 1, the one or more holding sections being configured to hold the one or more restoration forms in order to shape the restoration material applied onto one or more labial surfaces of the one or more teeth to be restored into the predefined form.

21. The method of claim 1, the one or more restoration forms being veneer forms.

22. The method of claim 1, the set of teeth being one of the following: a mandibular dental arch, a maxillary dental arch.

23. The method of claim 1, the set of teeth comprising one or more natural teeth.

24. The method of claim 1, the set of teeth comprising one or more artificial teeth.

25. A holding splint for holding one or more restoration forms, the holding splint provided according to the method of claim 1, the holding splint being configured for being arranged in a patient's oral cavity on a set of teeth comprising one or more teeth to be restored, the holding splint comprising one or more tooth receptions for receiving one or more teeth, when being arranged on the set of teeth, the holding splint comprising one or more holding sections configured to hold the one or more restoration forms in order to shape restoration material applied onto one or more surfaces of the one or more teeth to be restored into a predefined form using the one or more restoration forms, the holding splint comprising one or more cutouts for arranging the one or more restoration forms at the one or more surfaces of the one or more teeth to be restored, when being held by the one or more holding sections, the one or more holding sections being configured to establish one or more non-destructively detachable physical connections between the holding splint and the restoration forms in order to hold the one or more restoration forms in place.

26. The holding splint of claim 25, the holding splint being equipped with the one or more restoration forms to be held by the holding splint.

27. The holding splint of claim 26, the one or more restoration forms being patient-individual restoration forms configured to apply the restoration material on the one or more surfaces of the one or more teeth to be restored into a predefined patient-individual form.

28. The holding splint of claim 25, the one or more restoration forms being generic restoration forms configured to apply the restoration material on the one or more surfaces of the one or more teeth to be restored into a predefined generic form.

29. A computer program product for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms, the one or more holding sections being configured to establish one or more non-destructively detachable physical connections between the holding splint and the restoration forms in order to hold the one or more restoration forms in place, the computer program product comprising a non-transitory computer readable storage medium having program instructions embodied therewith, the program instructions being executable by a processor of a computer device to cause the computer device to:

provide a 3D digital teeth model of the set of teeth in the patient's oral cavity comprising the one or more teeth to be restored, provide one or more 3D digital form models of the one or more restoration forms to be held by the holding splint, generate using the 3D digital teeth model and the one or more 3D digital form models a 3D digital model of the holding splint, the holding splint comprising one or more receptions for receiving one or more teeth, when being arranged on the set of teeth, the holding splint comprising one or more cutouts for arranging the one or more restoration forms at the one or more surfaces of the one or more teeth to be restored, when being held by the one or more holding sections, provide the 3D digital model of the holding splint as template for manufacturing the holding splint.

30. The computer program product of claim 29, the program instructions further being executable to cause the computer device to:

generate a 3D digital restoration model using the 3D digital teeth model, the 3D digital restoration model comprising restorations of the one or more teeth to be restored, generate the one or more 3D digital form models using the 3D digital restoration model, the restoration forms comprising negatives of restored sections of the restorations of the one or more teeth to be restored.

31. A computer device for providing a holding splint for holding one or more restoration forms, the holding splint being configured for being arranged in a patient's oral cavity on a set of teeth comprising one or more teeth to be restored, the holding splint comprising one or more holding sections configured to hold the one or more restoration forms in order to shape restoration material applied onto one or more surfaces of the one or more teeth to be restored into a predefined form using the one or more restoration forms, the one or more holding sections being configured to establish one or more non-destructively detachable physical connections between the holding splint and the restoration forms in order to hold the one or more restoration forms in place, the computer device comprising a processor and a memory storing program instructions executable by the processor, execution of the program instructions by the processor causing the computer device to:

provide a 3D digital teeth model of the set of teeth in the patient's oral cavity comprising the one or more teeth to be restored, provide one or more 3D digital form models of the one or more restoration forms to be held by the holding splint, generate using the 3D digital teeth model and the one or more 3D digital form models a 3D digital model of the holding splint, the holding splint comprising one or more receptions for receiving one or more teeth, when being arranged on the set of teeth, the holding splint comprising one or more cutouts for arranging the one or more restoration forms at the one or more surfaces of the one or more teeth to be restored, when being held by the one or more holding sections, provide the 3D digital model of the holding splint as template for manufacturing the holding splint.

32. The computer device of claim 31, execution of the program instructions by the processor further causing the computer device to:

generate a 3D digital restoration model using the 3D digital teeth model, the 3D digital restoration model comprising restorations of the one or more teeth to be restored, generate the one or more 3D digital form models using the 3D digital restoration model, the restoration forms comprising negatives of restored sections of the restorations of the one or more teeth to be restored.

33. A manufacturing system comprising the computer device of claim 31, the manufacturing system further comprising a manufacturing device configured to manufacture the holding splint, execution of the program instructions by the processor further causing the computer device to control the manufacturing device to manufacture the holding splint using the 3D digital model of the holding splint as template, the manufactured holding splint being a physical copy of the respective template.

34. The manufacturing system of claim 33, the manufacturing device further being configured to manufacture the one or more restoration forms using the 3D digital models of the one or more restoration forms as templates, each of the manufactured restoration forms being a physical copy of one of the respective templates.

35. The manufacturing system of claim 33, the manufacturing system comprising at least one of the following: a machining device, a 3D printing device.

* * * * *